US012487660B2

(12) United States Patent
Hatano

(10) Patent No.: US 12,487,660 B2
(45) Date of Patent: Dec. 2, 2025

(54) INFORMATION PROCESSING APPARATUS, INFORMATION PROCESSING SYSTEM, AND INFORMATION PROCESSING METHOD

(71) Applicant: Panasonic Automotive Systems Co., Ltd., Kanagawa (JP)

(72) Inventor: Takashi Hatano, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 41 days.

(21) Appl. No.: 18/597,620

(22) Filed: Mar. 6, 2024

(65) Prior Publication Data
US 2024/0310899 A1    Sep. 19, 2024

(30) Foreign Application Priority Data

Mar. 16, 2023   (JP) .................. 2023-041971

(51) Int. Cl.
G06F 3/01    (2006.01)
(52) U.S. Cl.
CPC .................. G06F 3/011 (2013.01)

(58) Field of Classification Search
None
See application file for complete search history.

(56) References Cited

U.S. PATENT DOCUMENTS

| 2019/0121522 | A1* | 4/2019 | Davis ............... G06V 40/28 |
| 2019/0209891 | A1* | 7/2019 | Fung ............... G06F 3/0338 |
| 2020/0179202 | A1* | 6/2020 | Stocker ............ A61G 7/1019 |
| 2023/0112984 | A1* | 4/2023 | Malin .............. G06F 3/04842 |
| | | | 715/825 |
| 2024/0220009 | A1* | 7/2024 | Dryer .............. G06F 1/1626 |

FOREIGN PATENT DOCUMENTS

JP    2018-032055    3/2018

* cited by examiner

Primary Examiner — Parul H Gupta
(74) Attorney, Agent, or Firm — Greenblum & Bernstein, P.L.C.

(57) ABSTRACT

An information processing apparatus includes a memory and a processor. A program is stored in the memory. The processor is coupled to the memory and configured to perform processing by executing the program. The processing includes accepting a setting of a virtual operation surface to be used for determining an operation to a device, and operating the device based on a positional relationship between a part of a body of a user and the virtual operation surface.

13 Claims, 13 Drawing Sheets

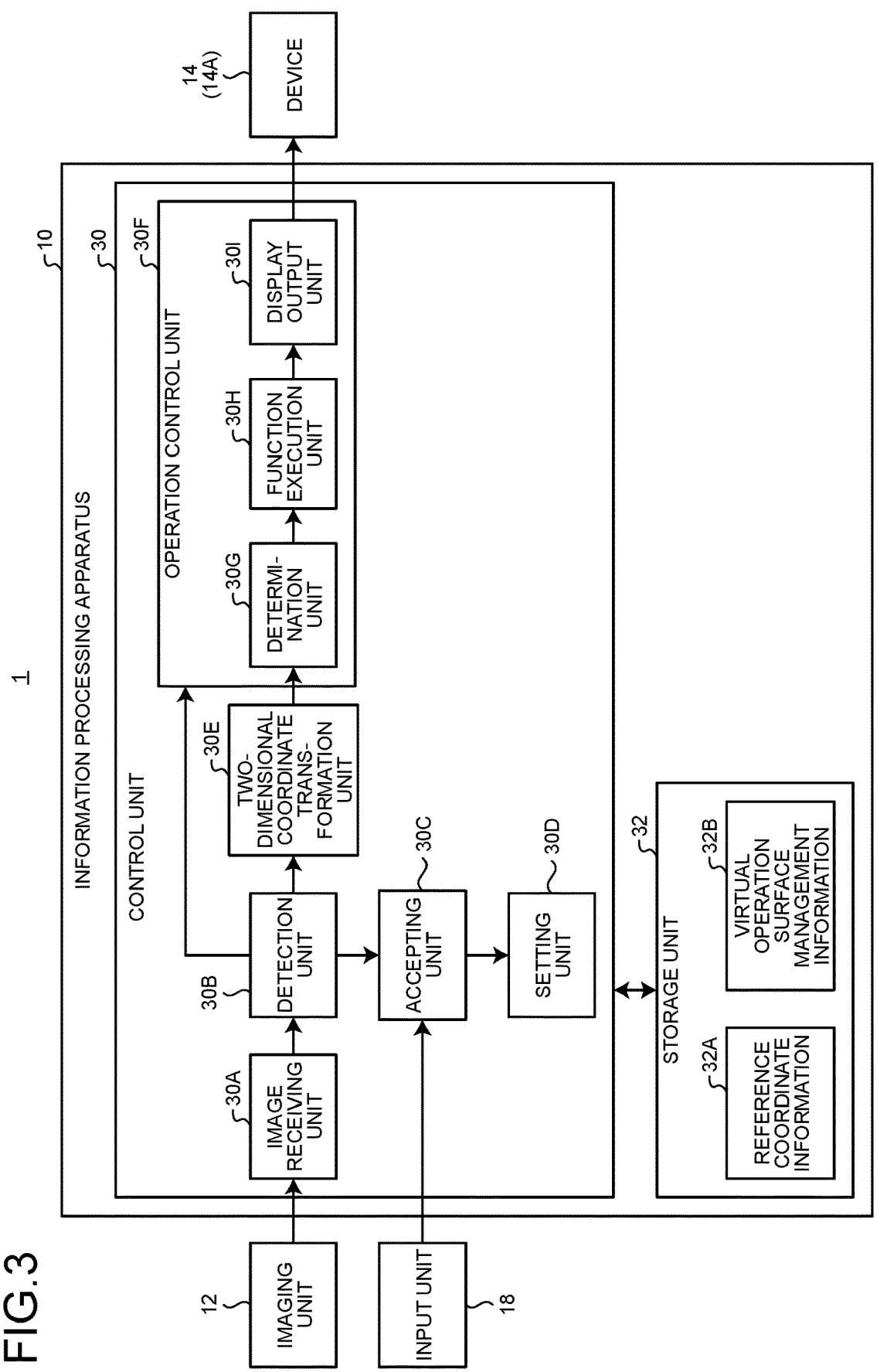

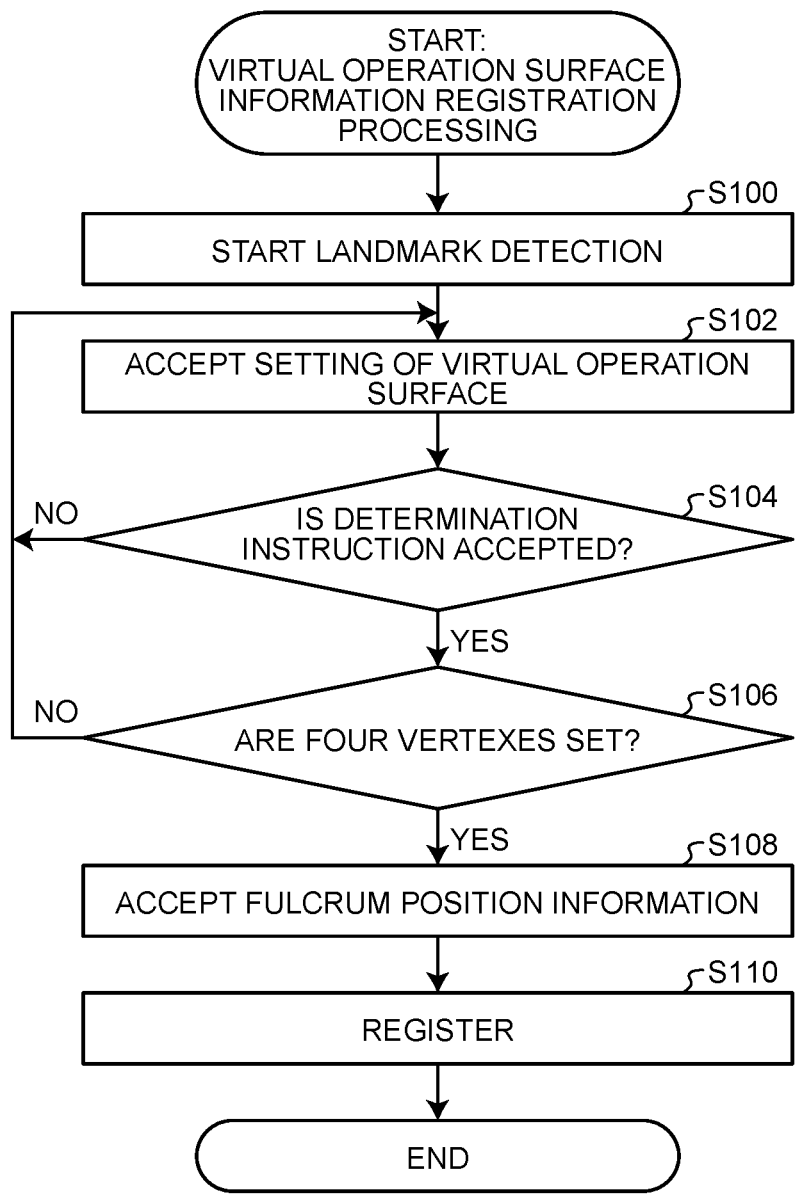

INFORMATION PROCESSING APPARATUS, INFORMATION PROCESSING SYSTEM, AND INFORMATION PROCESSING METHOD

CROSS-REFERENCE TO RELATED APPLICATIONS

This application is based upon and claims the benefit of priority from Japanese Patent Application No. 2023-041971, filed on Mar. 16, 2023, the entire contents of which are incorporated herein by reference.

FIELD

The present disclosure relates to an information processing apparatus, an information processing system, and an information processing method.

BACKGROUND

Conventionally, a system that controls the operation of a device according to the movement of the hand of a user is known (see, for example, JP 2018-32055 A). For example, there is known a technique for a device to be operated such as a display in which contents indicated in the display area changed according to the movement of the hand of the user without requiring the user to directly touch the display.

In the technology as described above, it is conceivable to set a virtual operation surface to be used for determining the operation to the device in a real space and to control the operation of the device according to the operation to the virtual operation surface. Such a virtual operation surface is desirably easy to operate for the user.

An object of the present disclosure is to provide an information processing apparatus, an information processing system, and an information processing method capable of facilitating the operation to the virtual operation surface.

SUMMARY

An information processing apparatus includes a memory and a processor. A program is stored in the memory. The processor is coupled to the memory and configured to perform processing by executing the program. The processing includes accepting a setting of a virtual operation surface to be used for determining an operation to a device, and operating the device based on a positional relationship between a part of a body of a user and the virtual operation surface.

BRIEF DESCRIPTION OF THE DRAWINGS

FIG. 3 is a functional block diagram of the information processing system according to the embodiment;

FIG. 11 is a flowchart illustrating an example of a flow of virtual operation surface information registration processing.

DETAILED DESCRIPTION

Hereinafter, embodiments of an information processing apparatus, an information processing system, and an information processing method according to the present disclosure will be described with reference to the accompanying drawings.

Figure 1A:
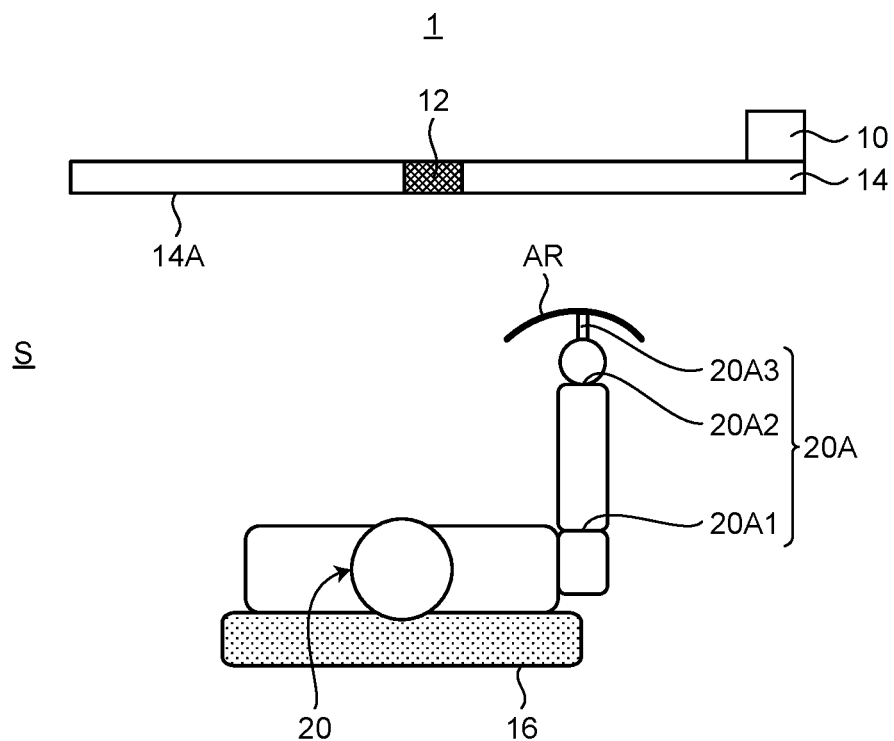
FIG. 1A is a schematic diagram of an information processing system according to an embodiment.
Figure 1B:
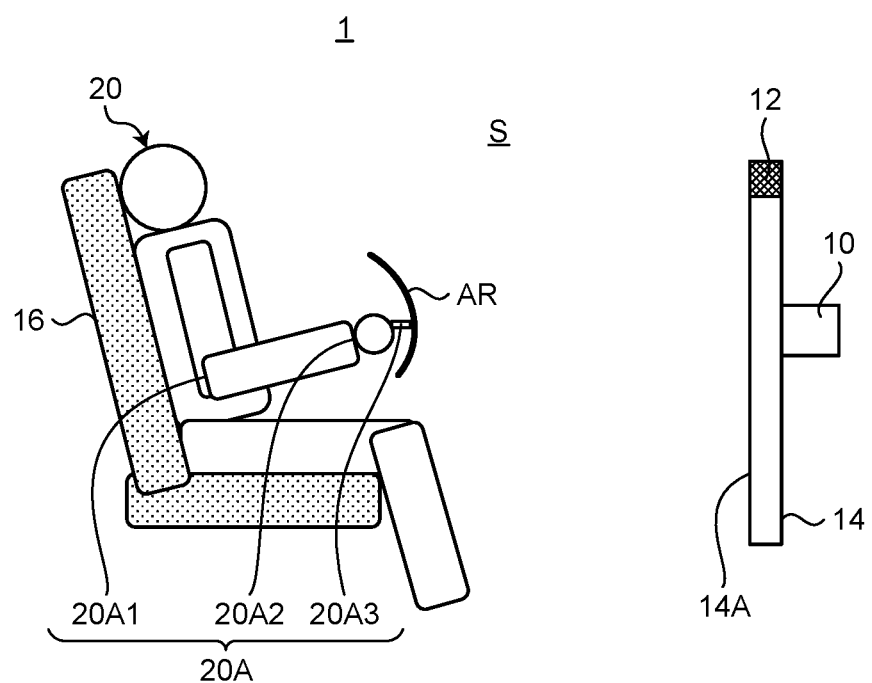
FIG. 1B is a schematic diagram of the information processing system according to the embodiment.

FIG. 1A and FIG. 1B are schematic diagrams of an information processing system 1 according to an embodiment. FIG. 1A is a top view of the information processing system 1. FIG. 1B is a side view of the information processing system 1.

The information processing system 1 includes an information processing apparatus 10, an imaging unit (imaging device) 12, and a device 14.

The information processing apparatus 10, the imaging unit 12, and the device 14 are connected to each other so as to be communicable in a wireless or wired manner.

The information processing apparatus 10 is a computer for operating and controlling the device 14 according to the status of the body of a user 20.

The status of the body of the user 20 represents a status of the part of the body of the user 20. Specifically, the status of the body of the user 20 is represented by the position, angle, shape, motion status, and the like of the part of the body of the user 20 in a real space S.

The imaging unit 12 is an example of a sensor that detects the user 20. In the present embodiment, the imaging unit 12 obtains imaged image data in which the user 20 is captured by imaging. Hereinafter, the imaged image data will be simply referred to as an imaged image.

The device 14 is an information processing apparatus that operates according to an operation by the user 20. In the present embodiment, the device 14 includes an operation accepting surface 14A. The operation accepting surface 14A is a surface for accepting the operation by the user. The operation accepting surface 14A is, for example, a display such as a touch panel. In the present embodiment, an aspect in which the operation accepting surface 14A has a quadrangular shape will be described as an example.

In the present embodiment, the user 20 performs an operation to a virtual operation surface AR to be described later without directly operating the operation accepting surface 14A. In the information processing system 1, the device 14 is operated by considering, according to the operation by the user 20 on the virtual operation surface AR, that an operation corresponding to the operation performed on the virtual operation surface AR has been performed on the operation accepting surface 14A.

The virtual operation surface AR is an operation surface to be used for determining the operation to the device 14, and is a virtual area set in the real space S. In the present embodiment, the virtual operation surface AR is used to determine the start of the operation to the device 14 (the details will be described later) and for other purposes.

In the information processing system 1, a desired virtual operation surface AR is set by the user 20 in a desired area in the real space S. In the present embodiment, the information processing system 1 is configured such that the user 20 seated on a chair 16 or the like can set the virtual operation surface AR in a posture in which an arm part 20A is in a comfortable state. For example, the arm part 20A of the user 20 includes an elbow part 20A1, a wrist part 20A2, a finger part 20A3, and the like. The information processing apparatus 10 according to the present embodiment is configured such that it is possible to perform the operation to the device 14 via the virtual operation surface AR in a state in which the user 20 fixes at least one of the elbow part 20A1 and the wrist part 20A2 under the arm or places the same on an elbow placing part or the like of the chair 16 (the details will be described later).

Figure 2:
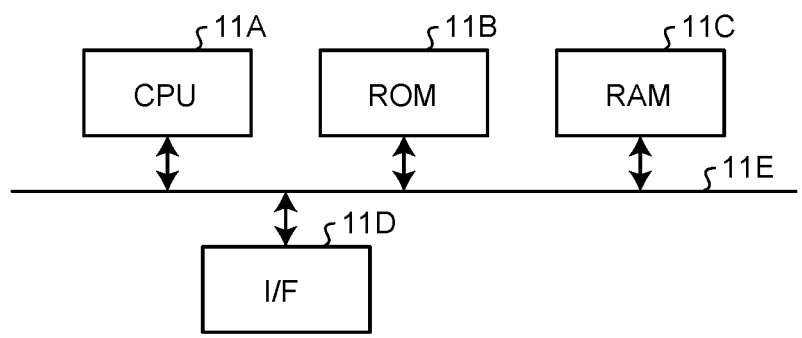
FIG. 2 is a hardware configuration diagram of an information processing apparatus.

FIG. 2 is an example of a hardware configuration diagram of the information processing apparatus 10.

In the information processing apparatus 10, a central processing unit (CPU, processor) 11A, a read only memory (ROM) 11B, a RAM 11C, an I/F 11D, and the like are connected to each other by a bus 11E, and a hardware configuration using a normal computer is adopted.

The CPU 11A is an arithmetic device that controls the information processing apparatus 10 according to the present embodiment. The ROM 11B stores a program and the like that implement various processing by the CPU 11A. The RAM 11C stores data necessary for various processing by the CPU 11A. The I/F 11D is an interface for transmitting and accepting data.

A program for executing information processing to be executed by the information processing apparatus 10 according to the present embodiment is provided by being incorporated in the ROM 11B or the like in advance. Note that the program to be executed by the information processing apparatus 10 according to the present embodiment may be provided by being recorded in a computer-readable recording medium such as a CD-ROM, a flexible disk (FD), a CD-R, or a digital versatile disc (DVD) as a file in a format that can be installed or executed in the information processing apparatus 10.

FIG. 3 is an example of a functional block diagram of the information processing system 1 according to the embodiment.

The information processing system 1 includes the information processing apparatus 10, the imaging unit 12, the device 14, and an input unit 18.

The input unit 18 is a mechanism for accepting an operation input by the user. The input unit 18 is, for example, a pointing device such as a mouse, a keyboard, a switch, or the like. The input unit 18 and the information processing apparatus 10 are connected to each other so as to be able to exchange signals.

The information processing apparatus 10 includes a control unit 30 and a storage unit 32. The control unit 30 and the storage unit 32 are connected to each other so as to be able to exchange data and signals.

The storage unit 32 stores various data. The storage unit 32 is implemented by hardware for storing information (in other words, data), such as a memory or a storage. In the present embodiment, the storage unit 32 stores reference coordinate information 32A and virtual operation surface management information 32B.

The reference coordinate information 32A includes three-dimensional (3D) position coordinates of the installation position of the imaging unit 12, information of the attachment angle of the imaging unit 12, 3D position coordinates of the device 14 and the operation accepting surface 14A of the device 14 in the real space, and the like.

The virtual operation surface management information 32B is a database in which virtual operation surface information representing the virtual operation surface AR and fulcrum position information on a fulcrum used when the setting of the virtual operation surface AR is accepted are associated with each other. The data format of the virtual operation surface management information 32B may be a table or the like and is not limited to a database. The virtual operation surface information is represented by 3D position coordinates of the virtual operation surface AR in the real space S. The fulcrum position information is represented by 3D position coordinates in the real space S of the position of the fulcrum used when the setting of the virtual operation surface AR is accepted. The virtual operation surface management information 32B is updated by the control unit 30.

The control unit 30 executes various types of information processing. For example, the CPU 11A reads the program from the ROM 11B onto the RAM 11C and executes the program, thereby implementing each functional unit described later of the control unit 30 on the computer.

The control unit 30 includes an image receiving unit 30A, a detection unit 30B, an accepting unit 30C, a setting unit 30D, a two-dimensional (2D) coordinate transformation unit 30E, and an operation control unit 30F. The operation control unit 30F includes a determination unit 30G, a function execution unit 30H, and a display output unit 30I.

Some or all of the image receiving unit 30A, the detection unit 30B, the accepting unit 30C, the setting unit 30D, the 2D coordinate transformation unit 30E, the operation control unit 30F, the determination unit 30G, the function execution unit 30H, and the display output unit 30I may be implemented by causing a processing device such as the CPU 11A to execute a program, that is, by software, may be implemented by hardware such as an integrated circuit (IC), or may be implemented by using software and hardware in combination. In addition, at least one of the image receiving unit 30A, the detection unit 30B, the accepting unit 30C, the setting unit 30D, the 2D coordinate transformation unit 30E, the operation control unit 30F, the determination unit 30G, the function execution unit 30H, and the display output unit 30I may be mounted on an external information processing apparatus connected to the information processing apparatus 10 so as to be communicable via a network or the like.

The image receiving unit 30A receives an imaged image from the imaging unit 12. In the present embodiment, the imaging unit 12 sequentially outputs, to the information processing apparatus 10, imaged images obtained by sequentially imaging the users 20 present around the device 14 in chronological order. Therefore, the image receiving unit 30A sequentially receives the imaged images captured by the imaging unit 12. The image receiving unit 30A sequentially outputs the received imaged images to the detection unit 30B. That is, the image receiving unit 30A receives a moving image including a plurality of imaged images continuously captured by the imaging unit 12 in chronological order.

The detection unit 30B detects the status of the body of the user 20 based on the imaged image.

Specifically, the detection unit 30B detects a landmark that is a specific part of the user 20 captured in the imaged image by analyzing the imaged image by a known image analysis method.

The landmark is a specific part of the user 20. The specific part is a part of the body I of the user 20. The specific part is, for example, the arm part 20A, the elbow part 20A1, the wrist part 20A2, the finger part 20A3, and the like of the user 20. In addition, the detection unit 30B identifies 3D position coordinates of each identified specific part (for example, the arm part 20A, the elbow part 20A1, the wrist part 20A2, and the finger part 20A3) in the real space S by using the analysis result of the imaged image and the reference coordinate information 32A. As a method for identifying the 3D position coordinates of the specific part, a known method may be used. In addition, a stereo camera or a camera capable of receiving a depth map (distance image) may be used as the imaging unit 12 to identify the 3D position coordinates of the specific parts using the position and direction to the specific parts identified in the imaged image and the reference coordinate information 32A.

The accepting unit 30C accepts the setting of the virtual operation surface AR. The accepting unit 30C accepts the setting of the virtual operation surface AR represented by the operation by the user 20. For example, the accepting unit 30C accepts the setting of the virtual operation surface AR having a shape corresponding to the operation accepting surface 14A of the device 14. As described above, in the present embodiment, an aspect in which the operation accepting surface 14A has a quadrangular shape will be described as an example. Therefore, in the present embodiment, an aspect in which the accepting unit 30C accepts the setting of the quadrangular virtual operation surface AR will be described as an example.

In addition, the accepting unit 30C accepts, as the setting of the virtual operation surface AR, an area of a range set by moving a part closer to the finger part 20A3 than a predetermined part used as a fulcrum in the arm part 20A, using the predetermined part in the arm part 20A of the user 20 as the fulcrum. The fulcrum may be any part of the body of the user 20. In the present embodiment, an aspect in which the fulcrum is at least one of the elbow part 20A1 and the wrist part 20A2 will be described as an example.

That is, the user 20 inputs the setting of the virtual operation surface AR of a desired size to a desired position and area in the real space S by moving the finger part 20A3 side from the fulcrum, using the elbow part 20A1, the wrist part 20A2, or the like of the user 20 as the fulcrum.

Figure 4A:
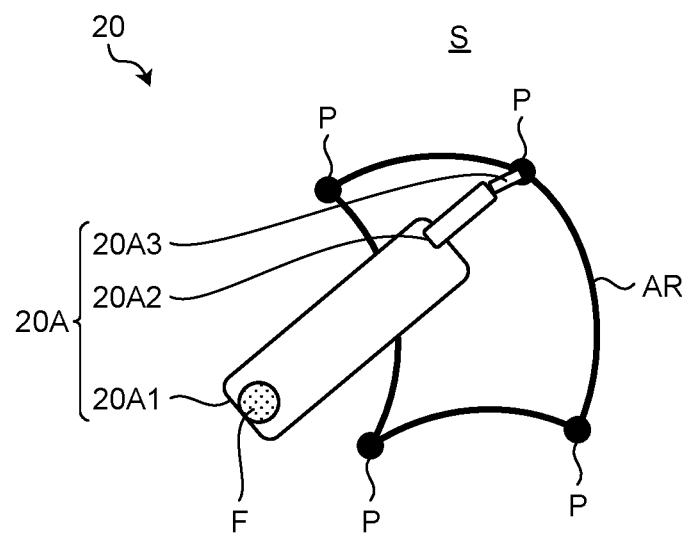
FIG. 4A is an explanatory diagram illustrating the acceptance of the setting of a virtual operation surface.

FIG. 4A is an explanatory diagram illustrating an example of the acceptance of the setting of the virtual operation surface AR. FIG. 4A illustrates a scene in which the user 20 inputs the setting of the virtual operation surface AR using the elbow part 20A1 as a fulcrum F.

For example, the user 20 sets the virtual operation surface AR having a shape corresponding to the operation accepting surface 14A of the device 14, using the elbow part 20A1 of the user 20 as the fulcrum F. In the present embodiment, a status in which the operation accepting surface 14A has a quadrangular shape will be described as an example. Therefore, for example, the user 20, while being seated on the chair 16, moves the wrist part 20A2, the finger part 20A3, or the like using the elbow part 20A1 as the fulcrum F, designates four vertexes P of four sides forming a quadrangle in the real space S, and performs a determination operation. The determination operation may be performed, for example, by a separate operation instruction of the input unit 18. In addition, the determination operation may be performed by a predetermined gesture by the user 20.

The accepting unit 30C analyzes the status of the body of the user 20 based on the 3D position coordinates of the specific part, which are the detection result of the specific part by the detection unit 30B in the imaged image received by the image receiving unit 30A. By this analysis processing, the accepting unit 30C accepts the designation of the four vertexes P by the user 20. Then, the accepting unit 30C calculates, as the virtual operation surface information representing the virtual operation surface AR, 3D position coordinates of each of the accepted four vertexes P in the real space S and information representing an area having a quadrangular shape in the real space S represented by a line connecting these four vertexes P. Through this processing, the accepting unit 30C accepts the setting of the virtual operation surface AR represented by the virtual operation surface information.

In addition, the accepting unit 30C accepts the fulcrum position information on the fulcrum F used when the setting of the virtual operation surface AR is accepted. The fulcrum position information is information representing a part of the body that the user 20 uses as the fulcrum F when setting the virtual operation surface AR and the 3D position coordinates of the part in the real space S.

The accepting unit 30C may determine which part of the user 20 is used as the fulcrum F when the setting of the virtual operation surface AR is accepted by analyzing the status of the user 20 based on the 3D position coordinates of the specific part. Alternatively, the accepting unit 30C may accept, as the fulcrum position information, information representing a part used as the fulcrum F when the setting of the virtual operation surface AR is accepted according to an operation instruction of the input unit 18 by the user.

Figure 4B:
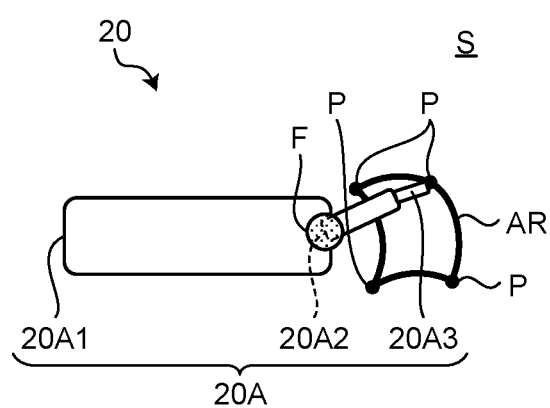
FIG. 4B is an explanatory diagram illustrating the acceptance of the setting of the virtual operation surface.

FIG. 4B is an explanatory diagram illustrating an example of the acceptance of the setting of the virtual operation surface AR. FIG. 4B illustrates a scene in which the user 20 inputs the setting of the virtual operation surface AR using the wrist part 20A2 as the fulcrum F.

For example, the user 20 sets the virtual operation surface AR having a shape corresponding to the operation accepting surface 14A of the device 14 with the wrist part 20A2 of the user 20 as the fulcrum F. For example, the user 20, while being seated on the chair 16, moves the finger part 20A3 using the wrist part 20A2 as the fulcrum F, designates four vertexes P of four sides forming a quadrangle in the real space S, and performs the determination operation.

The accepting unit 30C accepts the designation of the four vertexes P by the user 20 by analyzing the status of the body of the user 20 based on the 3D position coordinates of the specific part, which are the detection result of the specific part by the detection unit 30B in the imaged image received by the image receiving unit 30A. Then, similarly to the above, the accepting unit 30C calculates, as the virtual operation surface information representing the virtual operation surface AR, the 3D position coordinates of each of the accepted four vertexes P in the real space S and the information representing an area having a quadrangular shape in the real space S represented by a line connecting these four vertexes P. Through this processing, the accepting unit 30C accepts the setting of the virtual operation surface AR represented by the virtual operation surface information.

In addition, similarly to the above, the accepting unit 30C accepts the fulcrum position information on the fulcrum F used when the setting of the virtual operation surface AR is accepted.

The accepting unit 30C outputs, to the setting unit 30D, the virtual operation surface information of the virtual operation surface AR whose setting has been accepted and the fulcrum position information representing the part used as the fulcrum F when the setting of the virtual operation surface AR is accepted and the 3D position coordinates of the part.

The accepting unit 30C may accept the setting of the virtual operation surface AR having a planar shape or a curved shape.

For example, the accepting unit 30C may accept, as the virtual operation surface information representing the virtual operation surface AR, the 3D position coordinates of each of the accepted four vertexes P in the real space S and the information representing an area having a quadrangular and planar shape in the real space S represented by a line connecting these four vertexes P.

Alternatively, the accepting unit 30C may accept, as the virtual operation surface information representing the virtual operation surface AR, the 3D position coordinates of each of the accepted four vertexes P in the real space S and the information representing an area having a quadrangular and curved shape in the real space S represented by a line connecting these four vertexes P. In the case of the curved virtual operation surface AR, for example, the accepting unit 30C may accept information representing a curved area along a spherical surface centered on the fulcrum F at the time of the setting of the virtual operation surface AR and having a length from the fulcrum F to the vertex P as a radius, as the virtual operation surface information representing the virtual operation surface AR. Alternatively, the accepting unit 30C may accept information representing a curved area along a spherical surface centered on the position of the eye of the user 20 when the setting of the virtual operation surface AR is accepted and having a length from the center to the vertex P as a radius, as the virtual operation surface information representing the virtual operation surface AR.

In addition, the accepting unit 30C may accept the setting of the virtual operation surface AR on the surface of the object in the real space S. In this case, for example, the user 20 sets the virtual operation surface AR on the surface of the object such as the chair 16 in the real space S.

Figure 5A:
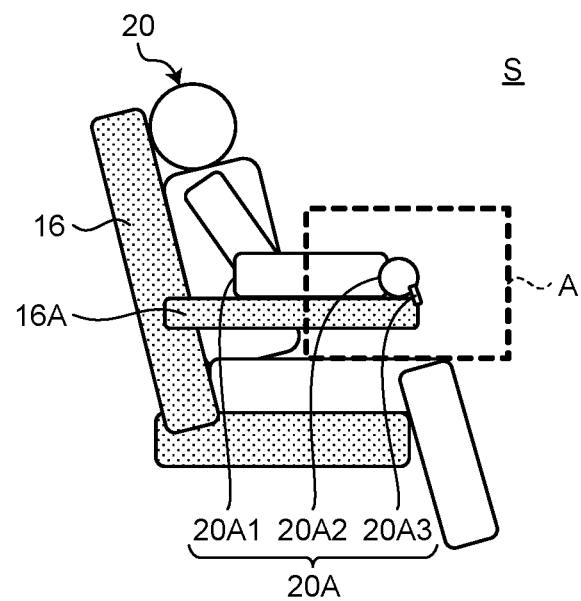
FIG. 5A is an explanatory diagram illustrating the acceptance of the setting of the virtual operation surface.
Figure 5B:
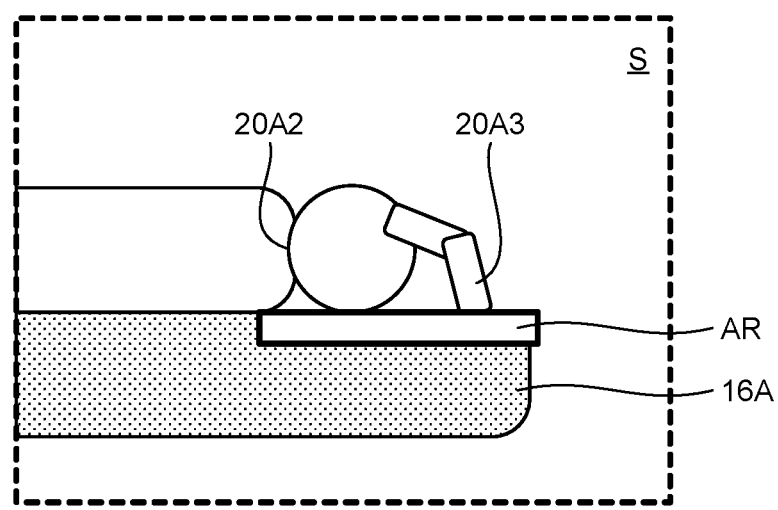
FIG. 5B is an explanatory diagram illustrating the acceptance of the setting of the virtual operation surface.

FIG. 5A and FIG. 5B are explanatory diagrams illustrating examples of the acceptance of the setting of the virtual operation surface AR. FIGS. 5A and 5B illustrate a scene in which the user 20 seated on the chair 16 moves the finger part 20A3 of the arm part 20A placed on an elbow placing part 16A and inputs the setting of the virtual operation surface AR to the surface of the elbow placing part 16A. FIG. 5B is an enlarged schematic view of a partial area A in FIG. 5A.

For example, the user 20 seated on the chair 16 sets the virtual operation surface AR on the surface of the elbow placing part 16A by performing an operation such as touching the surface of the elbow placing part 16A with the finger part 20A3 or the like while placing the arm part 20A on the elbow placing part 16A. For example, the user 20, while being seated on the chair 16, moves the finger part 20A3, designates four vertexes P of four sides forming a quadrangle on the elbow placing part 16A, and performs the determination operation.

The accepting unit 30C accepts the designation of the four vertexes P by the user 20 by analyzing the status of the body of the user 20 based on the 3D position coordinates of the specific part, which are the detection result of the specific part by the detection unit 30B in the imaged image received by the image receiving unit 30A. Then, similarly to the above, the accepting unit 30C calculates, as the virtual operation surface information representing the virtual operation surface AR, the 3D position coordinates of each of the accepted four vertexes P in the real space S and the information representing an area having a quadrangular shape in the real space S represented by a line connecting these four vertexes P. Through this processing, the accepting unit 30C accepts the setting of the virtual operation surface AR set on the elbow placing part 16A.

In this case, the accepting unit 30C can accept the setting by using the surface of the object such as the elbow placing part 16A placed in the real space S as the virtual operation surface AR, without separately installing additional equipment such as a touch panel in the information processing system 1.

In addition, the accepting unit 30C may accept the settings of a plurality of virtual operation surfaces AR different from each other in at least one of the position and the range in the real space S.

Figure 6A:
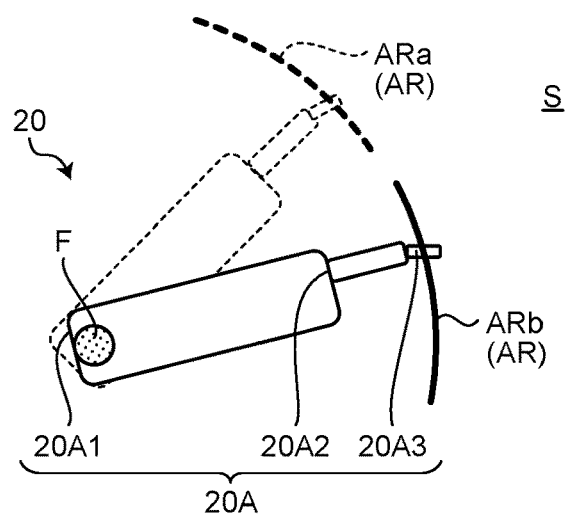
FIG. 6A is an explanatory diagram illustrating the acceptance of the setting of a plurality of virtual operation surfaces.

FIG. 6A is an explanatory diagram illustrating an example of the acceptance of the setting of the plurality of virtual operation surfaces AR. FIG. 6A illustrates a scene in which the user 20 inputs the settings of two virtual operation surfaces AR (a virtual operation surface ARa and virtual operation surface ARb) using the arm part 20A as the fulcrum F.

For example, similarly to the above, the user 20 sets the virtual operation surface AR having a shape corresponding to the operation accepting surface 14A of the device 14, using the elbow part 20A1 of the user 20 as the fulcrum, and performs the determination operation. At this time, the user 20 may set a plurality of virtual operation surfaces AR different from each other in at least one of the position, area, and range in the real space S.

The accepting unit 30C accepts the setting of the virtual operation surface AR represented by the virtual operation surface information representing each of the plurality of virtual operation surfaces AR by analyzing the status of the body of the user 20 based on the 3D position coordinates of the specific part, which are the detection result of the specific part by the detection unit 30B in the imaged image received by the image receiving unit 30A. In addition, similarly to the above, the accepting unit 30C identifies the fulcrum position information on the fulcrum F used when each of the plurality of virtual operation surfaces AR is set.

Then, similarly to the above, the accepting unit 30C may output, to the setting unit 30D, the virtual operation surface information of the plurality of virtual operation surfaces AR whose setting has been accepted and the fulcrum position information representing the part of the body used as the fulcrum F when the setting of each of the plurality of virtual operation surfaces AR is accepted and the 3D position coordinates of the part in D.

Figure 6B:
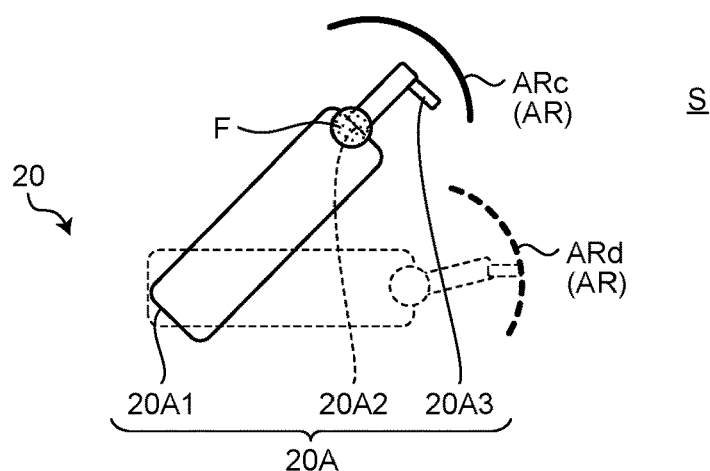
FIG. 6B is an explanatory diagram illustrating the acceptance of the setting of the plurality of virtual operation surfaces.

FIG. 6B is an explanatory diagram illustrating an example of the acceptance of the setting of the plurality of virtual operation surfaces AR. FIG. 6B illustrates a scene in which the user 20 inputs the settings of two virtual operation surfaces AR (a virtual operation surface ARc and virtual operation surface ARd) using the wrist part 20A2 as the fulcrum F.

For example, similarly to the above, the user 20 sets the virtual operation surface AR having a shape corresponding to the operation accepting surface 14A of the device 14, using the wrist part 20A2 of the user 20 as the fulcrum, and performs the determination operation. At this time, the user 20 may set the plurality of virtual operation surfaces AR different from each other in at least one of the position, area, and range in the real space S.

The accepting unit 30C accepts the setting of the virtual operation surface AR (the virtual operation surface ARc and virtual operation surface ARd) represented by the virtual operation surface information representing each of the plurality of virtual operation surfaces AR by analyzing the status of the body of the user 20 based on the 3D position coordinates of the specific part, which are the detection result of the specific part by the detection unit 30B in the imaged image received by the image receiving unit 30A.

Then, similarly to the above, the accepting unit 30C may output, to the setting unit 30D, the virtual operation surface information of each of the plurality of virtual operation surfaces AR whose setting has been accepted and the fulcrum position information representing the part of the body used as the fulcrum F when the setting of each of the plurality of virtual operation surfaces AR is accepted and the 3D position information of the part in the real space S.

Figure 6C:
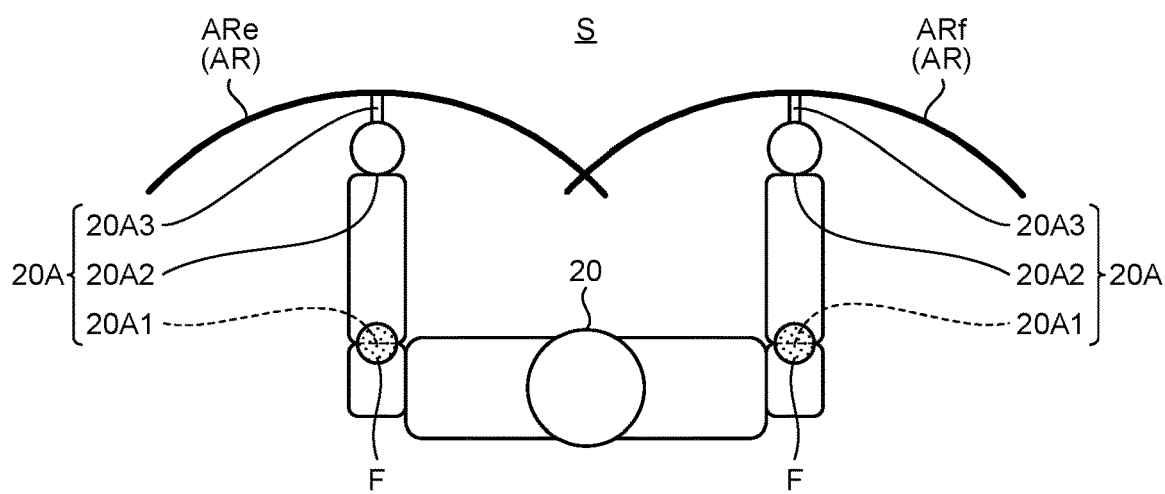
FIG. 6C is an explanatory diagram illustrating the acceptance of the setting of the plurality of virtual operation surfaces.

FIG. 6C is an explanatory diagram illustrating an example of the acceptance of the setting of the plurality of virtual operation surfaces AR. FIG. 6C illustrates a scene in which the user 20 inputs the settings of two virtual operation surfaces AR (a virtual operation surface ARe and virtual operation surface ARf) for each of the right hand and the left hand, using the elbow part 20A1 of each of the left and right arm parts 20A as the fulcrum F.

For example, similarly to the above, the user 20 sets the virtual operation surface AR having a shape corresponding to the operation accepting surface 14A of the device 14, using the elbow part 20A1 of each of the left and right arm parts 20A of the user 20 as the fulcrum F, and performs the determination operation.

The accepting unit 30C accepts the setting of the virtual operation surface AR (the virtual operation surface ARe and virtual operation surface ARf) represented by the virtual operation surface information representing each of the plurality of virtual operation surfaces AR by analyzing the status of the body of the user 20 based on the 3D position coordinates of the specific part, which are the detection result of the specific part by the detection unit 30B in the imaged image received by the image receiving unit 30A.

Then, similarly to the above, the accepting unit 30C may output, to the setting unit 30D, the virtual operation surface information of each of the plurality of virtual operation surfaces AR whose setting has been accepted and the fulcrum position information representing the part of the body used as the fulcrum F when the setting of each of the plurality of virtual operation surfaces AR is accepted and the 3D position information of the part in the real space S.

Returning to FIG. 3, the description will be continued.

The setting unit 30D registers, in the virtual operation surface management information 32B, the fulcrum position information on the fulcrum F used when the setting of the virtual operation surface AR is accepted and the virtual operation surface information representing the virtual operation surface AR in association with each other.

The 2D coordinate transformation unit 30E transforms the 3D position coordinates of each part of the body of the user 20 captured in the imaged image and identified by the detection unit 30B into 2D position coordinates on the operation accepting surface 14A of the device 14. A known method may be used for coordinate transformation processing that transforms the 3D position coordinates of the specific part into the 2D position coordinates on the operation accepting surface 14A.

The operation control unit 30F operates the device 14 based on the positional relationship between the part of the body of the user 20 and the virtual operation surface AR.

When determining that a predetermined part of the body of the user 20 comes into contact with the virtual operation surface AR or passes through the virtual operation surface AR, the operation control unit 30F determines the start of the operation to the device 14, and executes an operation corresponding to the motion status of the part of the body after the determination of the start of the operation to the device 14.

The predetermined part of the body of the user 20 is a part of the arm part 20A closer to the finger part 20A3 than the elbow part 20A1, a part closer to the finger part 20A3 than the wrist part 20A2, the finger part 20A3, or the like. The part of the body of the user 20 used for the operation determination on the virtual operation surface AR may be determined in advance, and is not limited to these parts. In the present embodiment, a description will be given assuming an aspect in which the part of the body of the user 20 used for the operation determination on the virtual operation surface AR is at least a part of the arm part 20A closer to the finger part 20A3 than the elbow part 20A1.

The state in which the predetermined part of the body of the user 20 passes through the virtual operation surface AR means that the predetermined part of the body of the user 20 is positioned in an area closer to the device 14 than the virtual operation surface AR. In addition, as will be described in detail later, when the state in which the predetermined part of the body of the user 20 passes through the virtual operation surface AR is canceled, it means that the predetermined part of the body of the user 20 is positioned in an area closer to the body of the user 20 than the virtual operation surface AR.

In detail, the operation control unit 30F includes the determination unit 30G, the function execution unit 30H, and the display output unit 30I.

The determination unit 30G determines the positional relationship of the part of the body of the user 20 with respect to the virtual operation surface AR and the processing content on the device 14, using the virtual operation surface AR and the detection result of the status of the body of the user 20 by the detection unit 30B. The processing content is, for example, touch-down, touch-up, flick, drag, or the like, but is not limited thereto.

The function execution unit 30H executes the processing content represented by the determination result by the determination unit 30G. The display output unit 30I displays a result of executing the processing content on the operation accepting surface 14A of the device 14.

Processing by the operation control unit 30F will be described in detail.

Figure 7A:
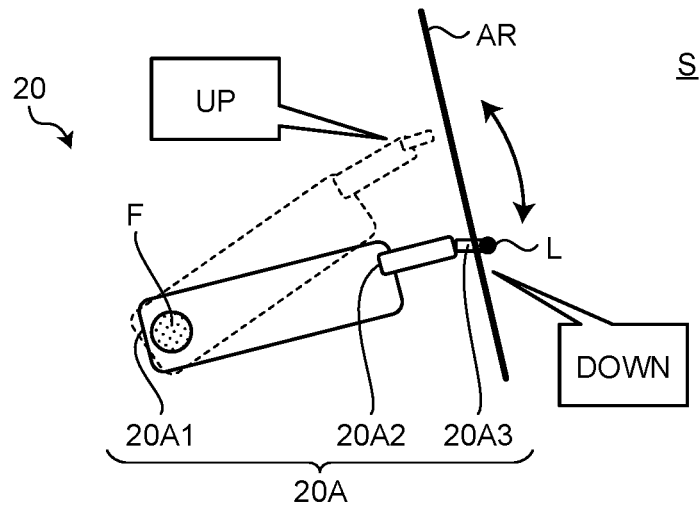
FIG. 7A is an explanatory diagram in which an operation is performed on the virtual operation surface using an elbow part as a fulcrum.
Figure 7B:
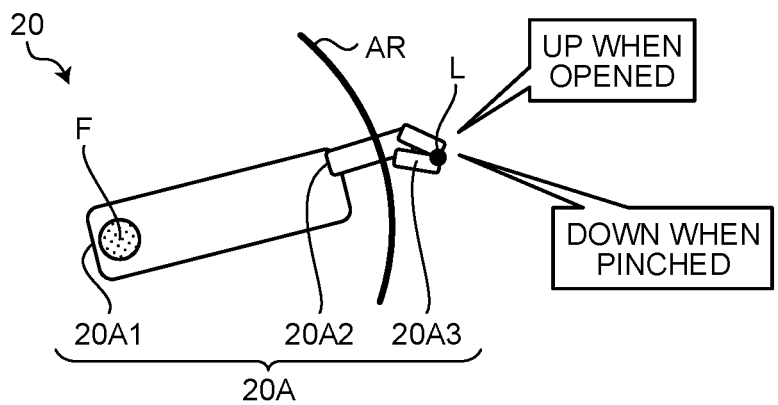
FIG. 7B is an explanatory diagram in which an operation is performed on the virtual operation surface using the elbow part as the fulcrum.
Figure 7C:
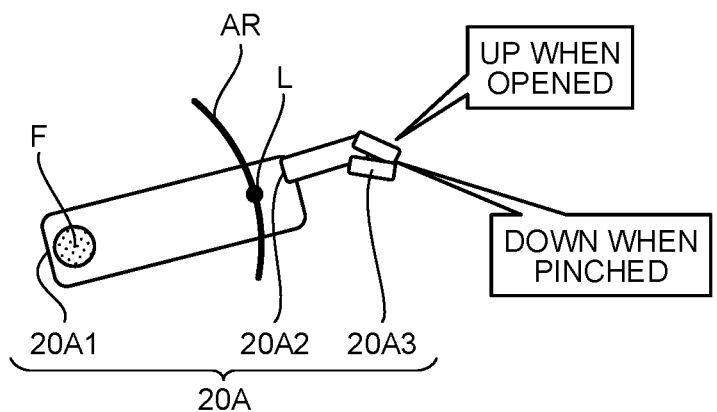
FIG. 7C is an explanatory diagram in which an operation is performed on the virtual operation surface using the elbow part as the fulcrum.

FIGS. 7A to 7C are explanatory diagrams illustrating examples of a case where the user 20 seated on the chair 16 or the like performs an operation to the virtual operation surface AR using the elbow part 20A1 as the fulcrum F.

FIG. 7A is an explanatory diagram illustrating an example of operation execution processing by the operation control unit 30F based on a motion in which the finger part 20A3 of the user 20 is swung down at a constant speed or more and stopped or swung up.

As illustrated in FIG. 7A, for example, a scene is assumed in which the user 20 swings down the part on the finger part 20A3 side from the elbow part 20A1 using the elbow part 20A1 as the fulcrum F by moving the finger part 20A3 side at a constant speed or more, and then the finger part 20A3 stops in a state in which it has passed through the virtual operation surface AR. When determining that the finger part 20A3 of the user 20 has passed through the virtual operation surface AR identified by the virtual operation surface information stored in the virtual operation surface management information 32B by analyzing the detection result by the detection unit 30B, the operation control unit 30F determines the start of the operation to the device 14.

In addition, the operation control unit 30F identifies the virtual operation surface AR through which the finger part 20A3 has passed as the virtual operation surface AR used for the operation of the device 14. Therefore, when the user 20 performs an arbitrary motion in the real space S, one or a plurality of virtual operation surfaces AR for which the passing of the finger part 20A3 of the user 20 is determined are identified as the virtual operation surfaces AR used for the operation of the device 14, among the plurality of virtual operation surfaces AR identified by one or a plurality of pieces of virtual operation surface information registered in the virtual operation surface management information 32B.

At this time, the operation control unit 30F identifies the part of the body that is used as the fulcrum F by the user 20 by analyzing the detection result by the detection unit 30B. Here, a scene is assumed in which the operation control unit 30F identifies the elbow part 20A1 as the fulcrum F. When a plurality of pieces of virtual operation surface information are stored in the virtual operation surface management information 32B as the virtual operation surface information of the virtual operation surface AR through which the finger part 20A3 has passed, the operation control unit 30F identifies the virtual operation surface AR represented by the virtual operation surface information associated with the fulcrum position information representing the part of the body identified as the fulcrum F, as the virtual operation surface AR used for the operation of the device 14.

Then, the operation control unit 30F executes, on the device 14, an operation corresponding to the motion status of the finger part 20A3 of the user 20 positioned on the identified virtual operation surface AR and on the device 14 side from the virtual operation surface AR.

Specifically, the operation control unit 30F determines that a touch-down operation has been performed when the finger part 20A3 of the user 20 stops in the state in which it has passed through the virtual operation surface AR. In addition, the operation control unit 30F identifies the 3D position coordinates in the real space S, which are detected by the detection unit 30B, of the finger part 20A3 that has stopped in the state of passing through the virtual operation surface AR, and as an operation position L with respect to the operation accepting surface 14A of the device 14. Specifically, the operation control unit 30F identifies 2D position coordinates obtained by transforming the 3D position coordinates of the finger part 20A3 in the real space S with the 2D coordinate transformation unit 30E as the operation position L on the operation accepting surface 14A.

Then, the operation control unit 30F executes, on the device 14, an operation corresponding to the touch-down operation to the identified operation position L on the operation accepting surface 14A.

In addition, for example, a scene is assumed in which the user 20 moves and swings up the finger part 20A3 side from the elbow part 20A1 using the elbow part 20A1 as the fulcrum F, and then the state in which the finger part 20A3 passes through the virtual operation surface AR has been canceled. J In this case, the operation control unit 30F determines that a touch-up operation has been performed. Then, the operation control unit 30F executes, on the device 14, an operation corresponding to the touch-up operation to the identified operation position L on the operation accepting surface 14A.

FIG. 7B is an explanatory diagram illustrating an example of operation execution processing by the operation control unit 30F in a case where the finger part 20A3 of the user 20 performs a pinching motion in the state in which it has passed through the virtual operation surface AR.

As illustrated in FIG. 7B, for example, a scene is assumed in which the user 20 moves the finger part 20A3 side from the elbow part 20A1 at a constant speed or more using the elbow part 20A1 as the fulcrum F, and then a pinching motion for pinching a virtual object is performed with the finger part 20A3 in the state in which the finger part 20A3 has passed through the virtual operation surface AR.

When determining that the finger part 20A3 of the user 20 has passed through the virtual operation surface AR identified by the virtual operation surface information stored in the virtual operation surface management information 32B by analyzing the detection result by the detection unit 30B, the operation control unit 30F determines the start of the operation to the device 14.

In addition, similarly to the above, the operation control unit 30F identifies the virtual operation surface AR through which the finger part 20A3 has passed as the virtual operation surface AR used for the operation of the device 14. Furthermore, similarly to the above, the operation control unit 30F identifies the part of the body that is used as the fulcrum F by the user 20. Then, the operation control unit 30F executes, on the device 14, the operation corresponding to the motion status of the finger part 20A3 of the user 20 positioned on the identified virtual operation surface AR and on the device 14 side from the virtual operation surface AR.

Specifically, the operation control unit 30F determines that the touch-down operation has been performed when the finger part 20A3 of the user 20 performs the pinching motion in the state in which it has passed through the virtual operation surface AR. The operation control unit 30F may determine whether or not the pinching motion has been performed using the detection result by the detection unit 30B. In addition, the operation control unit 30F identifies the 3D position coordinates in the real space S, which are detected by the detection unit 30B, of the point at which the pinching motion is performed by the finger part 20A3 in the state of passing through the virtual operation surface AR, as the operation position L with respect to the operation accepting surface 14A of the device 14. Specifically, the operation control unit 30F identifies the 2D position coordinates obtained by transforming the 3D position coordinates of the point at which the pinching motion is performed in the real space S with the 2D coordinate transformation unit 30E as the operation position L on the operation accepting surface 14A.

Then, the operation control unit 30F executes, on the device 14, the operation corresponding to the touch-down operation to the identified operation position L on the operation accepting surface 14A.

In addition, for example, a scene is assumed in which the finger part 20A3 of the user 20 is opened in a state in which it has passed through the virtual operation surface AR and the pinching motion is canceled. In this case, the operation control unit 30F determines that the touch-up operation has been performed. Then, the operation control unit 30F executes, on the device 14, the operation corresponding to the touch-up operation to the identified operation position L on the operation accepting surface 14A.

Alternatively, the operation control unit 30F may reset the virtual operation surface AR to be closer to the elbow part 20A1 of the user 20 than the setting position where the virtual operation surface AR has been accepted, and operate the device 14 based on the positional relationship between the reset virtual operation surface AR and the part of the body of the user 20.

FIG. 7C is an explanatory diagram illustrating an example of operation execution processing by the operation control unit 30F in a case where the operation control unit 30F resets the position of the virtual operation surface AR identified as the virtual operation surface AR used for the operation of the device 14 to be closer to the elbow part 20A1 than the wrist part 20A2 of the user 20, and the finger part 20A3 of the user 20 performs the pinching motion in a state in which it has passed through the virtual operation surface AR.

As illustrated in FIG. 7C, for example, the operation control unit 30F resets the virtual operation surface AR to be closer to the elbow part 20A1 of the user 20 than the setting position where the virtual operation surface AR has been accepted. FIG. 7C illustrates, as an example, a state in which the virtual operation surface AR is reset to a position between the elbow part 20A1 and the wrist part 20A2.

Then, for example, a scene is assumed in which the user 20 moves the finger part 20A3 side from the elbow part 20A1 at a constant speed or more using the elbow part 20A1 as the fulcrum F, and then a pinching motion for pinching a virtual object is performed with the finger part 20A3 in the state in which the finger part 20A3 has passed through the virtual operation surface AR.

When determining that the arm part 20A of the user 20 has passed through the reset virtual operation surface AR by analyzing the detection result by the detection unit 30B, the operation control unit 30F determines the start of the operation to the device 14.

Then, as in the pattern described with reference to FIG. 7B, the operation control unit 30F determines that the touch-down operation has been performed when the finger part 20A3 of the user 20 performs the pinching motion in the state in which it has passed through the virtual operation surface AR. The operation control unit 30F may determine whether or not the pinching motion has been performed using the detection result by the detection unit 30B. In addition, the operation control unit 30F identifies an intersection between the arm part 20A and the virtual operation surface AR that is detected by the detection unit 30B when the pinching motion is performed by the finger part 20A3 in the state in which it has passed through the virtual operation surface AR. Then, the operation control unit 30F identifies the 3D position coordinates of the identified intersection in the real space S as the operation position L with respect to the operation accepting surface 14A of the device 14. Specifically, the operation control unit 30F identifies the 2D position coordinates obtained by transforming the 3D position coordinates of the intersection in the real space S with the 2D coordinate transformation unit 30E as the operation position L on the operation accepting surface 14A.

Then, the operation control unit 30F executes, on the device 14, the operation corresponding to the touch-down operation to the identified operation position L on the operation accepting surface 14A.

In addition, for example, a scene is assumed in which the finger part 20A3 of the user 20 is opened in the state in which it has passed through the virtual operation surface AR and the pinching motion is canceled. In this case, the operation control unit 30F determines that the touch-up operation has been performed. Then, the operation control unit 30F executes, on the device 14, the operation corresponding to the touch-up operation to the identified operation position L on the operation accepting surface 14A.

Figure 8A:
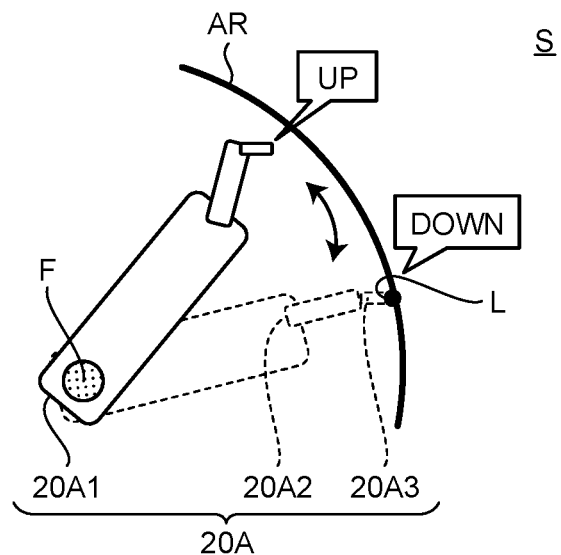
FIG. 8A is an explanatory diagram in which an operation is performed on the virtual operation surface using the elbow part and a wrist part as the fulcrums.
Figure 8B:
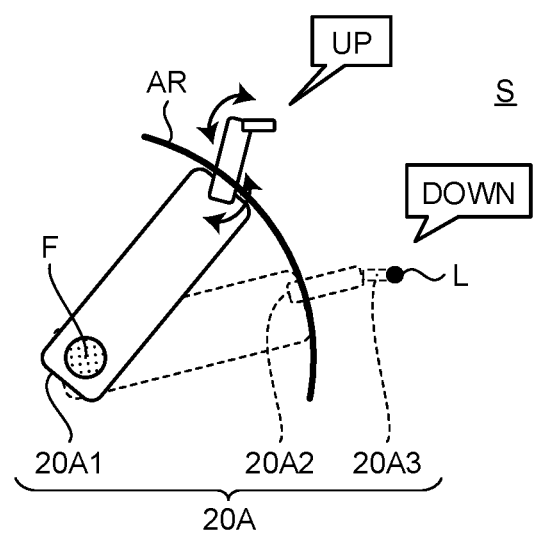
FIG. 8B is an explanatory diagram in which an operation is performed on the virtual operation surface using the elbow part and the wrist part as the fulcrums.

FIGS. 8A to 8B are explanatory diagrams illustrating examples of a case where the user 20 seated on the chair 16 or the like performs an operation to the virtual operation surface AR using the elbow part 20A1 and the wrist part 20A2 as the fulcrum F.

FIG. 8A is an explanatory diagram illustrating an example of operation execution processing by the operation control unit 30F based on the motion in which the finger part 20A3 of the user 20 is swung down at a constant speed or more and stopped or swung up.

As illustrated in FIG. 8A, for example, a scene is assumed in which the user 20 swings down the finger part 20A3 side from the elbow part 20A1 using the elbow part 20A1 as the fulcrum F by moving the finger part 20A3 side at a constant speed or more, and then the finger part 20A3 stops in a state in which it comes into contact with the virtual operation surface AR. When determining that the finger part 20A3 of the user 20 comes into contact with the virtual operation surface AR identified by the virtual operation surface information stored in the virtual operation surface management information 32B by analyzing the detection result by the detection unit 30B, the operation control unit 30F determines the start of the operation to the device 14.

In addition, the operation control unit 30F identifies the virtual operation surface AR with which the finger part 20A3 comes into contact as the virtual operation surface AR used for the operation of the device 14. Therefore, when the user 20 performs an arbitrary motion in the real space S, one or a plurality of virtual operation surfaces AR for which the touching of the finger part 20A3 of the user 20 is determined are identified as the virtual operation surfaces AR used for the operation of the device 14, among the plurality of virtual operation surfaces AR identified by one or a plurality of pieces of virtual operation surface information registered in the virtual operation surface management information 32B. In addition, similarly to the above, the operation control unit 30F identifies the part of the body that is used as the fulcrum F by the user 20 by analyzing the detection result by the detection unit 30B.

Then, the operation control unit 30F executes, on the device 14, the operation corresponding to the identified virtual operation surface AR used for the operation of the device 14 and the motion status of the finger part 20A3 of the user 20.

Specifically, the operation control unit 30F determines that the touch-down operation has been performed when the finger part 20A3 of the user 20 stops in the state in which it comes into contact with the virtual operation surface AR. In addition, the operation control unit 30F identifies the 3D position coordinates in the real space S, which are detected by the detection unit 30B, of the finger part 20A3 that has stopped in the state of coming into contact with the virtual operation surface AR, as the operation position L with respect to the operation accepting surface 14A of the device 14. Specifically, the operation control unit 30F identifies the 2D position coordinates obtained by transforming the 3D position coordinates of the finger part 20A3 in the real space S with the 2D coordinate transformation unit 30E as the operation position L on the operation accepting surface 14A.

Then, the operation control unit 30F executes, on the device 14, the operation corresponding to the touch-down operation to the identified operation position L on the operation accepting surface 14A.

In addition, for example, a scene is assumed in which the user 20 moves the wrist part 20A2 and the finger part 20A3 using the elbow part 20A1 as the fulcrum F, and then the state in which the finger part 20A3 comes into contact with the virtual operation surface AR has been canceled. In this case, the operation control unit 30F determines that the touch-up operation has been performed. Then, the operation control unit 30F executes, on the device 14, the operation corresponding to the touch-up operation to the identified operation position L on the operation accepting surface 14A.

FIG. 8B is an explanatory diagram illustrating an example of operation execution processing by the operation control unit 30F in a case where the wrist part 20A2 and the finger part 20A3 are stretched or the wrist part 20A2 and the finger part 20A3 are bent in a state in which the wrist part 20A2 and the finger part 20A3 of the user 20 have passed through the virtual operation surface AR.

As illustrated in FIG. 8B, for example, a scene is assumed in which the user 20 moves the finger part 20A3 side from the elbow part 20A1 at a constant speed or more using the elbow part 20A1 as the fulcrum F, and then a stretching motion of the wrist part 20A2 and the finger part 20A3 is performed in the state in which the finger part 20A3 has passed through the virtual operation surface AR.

When determining that the wrist part 20A2 and the finger part 20A3 of the user 20 have passed through the virtual operation surface AR identified by the virtual operation surface information stored in the virtual operation surface management information 32B by analyzing the detection result by the detection unit 30B, the operation control unit 30F determines the start of the operation to the device 14.

In addition, similarly to the above, the operation control unit 30F identifies the virtual operation surface AR through which the wrist part 20A2 and the finger part 20A3 have passed as the virtual operation surface AR used for the operation of the device 14. Furthermore, similarly to the above, the operation control unit 30F identifies the part of the body that is used as the fulcrum F by the user 20. Then, the operation control unit 30F executes, on the device 14, the operation corresponding to the motion status of the finger part 20A3 of the user 20 positioned on the identified virtual operation surface AR and on the device 14 side from the virtual operation surface AR.

Specifically, the operation control unit 30F determines that the touch-down operation has been performed when the stretching motion of the wrist part 20A2 and the finger part 20A3 is performed in a state in which the wrist part 20A2 and the finger part 20A3 of the user 20 have passed through the virtual operation surface AR. The operation control unit 30F may monitor the joint angles of the wrist part 20A2 and the finger part 20A3 using the detection result by the detection unit 30B and determine that the stretching motion of the wrist part 20A2 and the finger part 20A3 has been performed when the joint angles are equal to or larger than a threshold for determining that the wrist part 20A2 and the finger part 20A3 are stretched. In addition, the operation control unit 30F identifies the 3D position coordinates in the real space S, which are detected by the detection unit 30B, of the finger part 20A3 that has been stretched in the state of passing through the virtual operation surface AR, as the operation position L with respect to the operation accepting surface 14A of the device 14. Specifically, the operation control unit 30F identifies the 2D position coordinates obtained by transforming the 3D position coordinates of the finger part 20A3 in the real space S with the 2D coordinate transformation unit 30E as the operation position L on the operation accepting surface 14A.

Then, the operation control unit 30F executes, on the device 14, the operation corresponding to the touch-down operation to the identified operation position L on the operation accepting surface 14A.

In addition, for example, a scene is assumed in which the wrist part 20A2 and the finger part 20A3 of the user 20 are retracted in a state in which they have passed through the virtual operation surface AR. The operation control unit 30F may monitor the joint angles of the wrist part 20A2 and the finger part 20A3 using the detection result by the detection unit 30B and determine that the retracting motion of the wrist part 20A2 and the finger part 20A3 has been performed when the joint angles are less than a threshold for determining that the wrist part 20A2 and the finger part 20A3 have been retracted.

In this case, the operation control unit 30F determines that the touch-up operation has been performed. Then, the operation control unit 30F executes, on the device 14, the operation corresponding to the touch-up operation to the identified operation position L on the operation accepting surface 14A.

FIGS. 9A to 9E are explanatory diagrams illustrating examples of a case where the user 20 seated on the chair 16 or the like performs an operation to the virtual operation surface AR using the wrist part 20A2 as the fulcrum F.

Figure 9A:
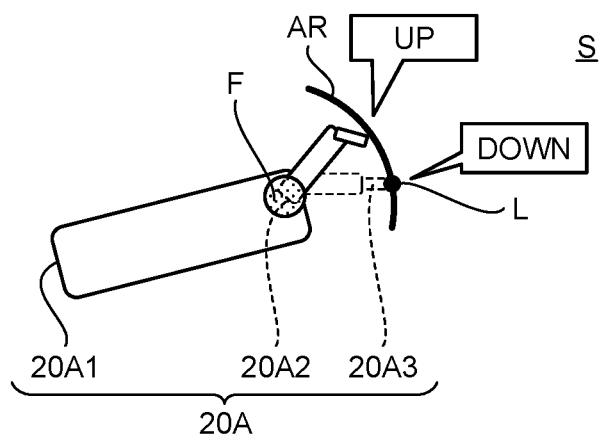
FIG. 9A is an explanatory diagram in which an operation is performed on the virtual operation surface using the wrist part as the fulcrum.

FIG. 9A is an explanatory diagram illustrating an example of operation execution processing by the operation control unit 30F based on an operation in which the user 20 touches the virtual operation surface AR or cancels the touch using the wrist part 20A2 as the fulcrum F.

As illustrated in FIG. 9A, for example, a scene is assumed in which the user 20 moves the finger part 20A3 side from the wrist part 20A2 using the wrist part 20A2 as the fulcrum F and touches the virtual operation surface AR. When determining that the finger part 20A3 of the user 20 comes into contact with the virtual operation surface AR identified by the virtual operation surface information stored in the virtual operation surface management information 32B by analyzing the detection result by the detection unit 30B, the operation control unit 30F determines the start of the operation to the device 14.

In addition, the operation control unit 30F identifies the virtual operation surface AR with which the finger part 20A3 comes into contact as the virtual operation surface AR used for the operation of the device 14. In addition, similarly to the above, the operation control unit 30F identifies the part of the body that is used as the fulcrum F by the user 20 by analyzing the detection result by the detection unit 30B. Here, a scene is assumed in which the operation control unit 30F identifies the wrist part 20A2 as the fulcrum F.

Then, the operation control unit 30F determines that the touch-down operation has been performed when the finger part 20A3 of the user 20 comes into contact with the virtual operation surface AR. In addition, the operation control unit 30F identifies the 3D position coordinates in the real space S, which are detected by the detection unit 30B, of the finger part 20A3 that has come into contact with the virtual operation surface AR, as the operation position L with respect to the operation accepting surface 14A of the device 14.

Then, the operation control unit 30F executes, on the device 14, the operation corresponding to the touch-down operation to the identified operation position L on the operation accepting surface 14A.

In addition, for example, a scene is assumed in which the user 20 bends the finger part 20A3 side from the wrist part 20A2 using the wrist part 20A2 as the fulcrum F, and then the state in which the finger part 20A3 is in contact with the virtual operation surface AR has been canceled. In this case, the operation control unit 30F determines that the touch-up operation has been performed. Then, the operation control unit 30F executes, on the device 14, the operation corresponding to the touch-up operation to the identified operation position L on the operation accepting surface 14A.

Figure 9B:
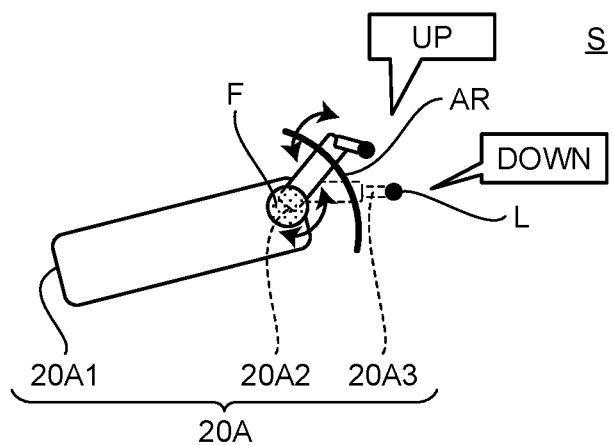
FIG. 9B is an explanatory diagram in which an operation is performed on the virtual operation surface using the wrist part as the fulcrum.

FIG. 9B is an explanatory diagram illustrating an example of operation execution processing by the operation control unit 30F based on the state in which the user 20 causes the finger part 20A3 to pass through the virtual operation surface AR using the wrist part 20A2 as the fulcrum F or the motion for canceling the state of passing.

As illustrated in FIG. 9B, for example, a scene is assumed in which the user 20 moves the finger part 20A3 side from the wrist part 20A2 using the wrist part 20A2 as the fulcrum F, and the finger part 20A3 has passed through the virtual operation surface AR. When determining that the finger part 20A3 of the user 20 has passed through the virtual operation surface AR identified by the virtual operation surface information stored in the virtual operation surface management information 32B by analyzing the detection result by the detection unit 30B, the operation control unit 30F determines the start of the operation to the device 14.

In addition, the operation control unit 30F identifies the virtual operation surface AR through which the finger part 20A3 has passed as the virtual operation surface AR used for the operation of the device 14. In addition, similarly to the above, the operation control unit 30F identifies the part of the body that is used as the fulcrum F by the user 20 by analyzing the detection result by the detection unit 30B. Here, a scene is assumed in which the operation control unit 30F identifies the wrist part 20A2 as the fulcrum F.

Then, the operation control unit 30F determines that the touch-down operation has been performed when the stretching motion of the wrist part 20A2 and the finger part 20A3 is performed in a state in which the finger part 20A3 of the user 20 has passed through the virtual operation surface AR. The operation control unit 30F may monitor the joint angles of the wrist part 20A2 and the finger part 20A3 using the detection result by the detection unit 30B and determine that the stretching motion of the wrist part 20A2 and the finger part 20A3 has been performed when the joint angles are equal to or larger than a threshold for determining that the wrist part 20A2 and the finger part 20A3 are stretched. In addition, the operation control unit 30F identifies the 3D position coordinates in the real space S, which are detected by the detection unit 30B, of the finger part 20A3 that has been stretched in the state of passing through the virtual operation surface AR, as the operation position L with respect to the operation accepting surface 14A of the device 14. Specifically, the operation control unit 30F identifies the 2D position coordinates obtained by transforming the 3D position coordinates of the finger part 20A3 in the real space S with the 2D coordinate transformation unit 30E as the operation position L on the operation accepting surface 14A.

Then, the operation control unit 30F executes, on the device 14, the operation corresponding to the touch-down operation to the identified operation position L on the operation accepting surface 14A.

In addition, for example, a scene is assumed in which the finger part 20A3 of the user 20 is retracted in a state in which it has passed through the virtual operation surface AR. The operation control unit 30F may monitor the joint angles of the wrist part 20A2 and the finger part 20A3 using the detection result by the detection unit 30B and determine that the retracting motion of the finger part 20A3 has been performed when the joint angles are less than a threshold for determining the retracting motion of the finger part 20A3.

In this case, the operation control unit 30F determines that the touch-up operation has been performed. Then, the operation control unit 30F executes, on the device 14, the operation corresponding to the touch-up operation to the identified operation position L on the operation accepting surface 14A.

Figure 9C:
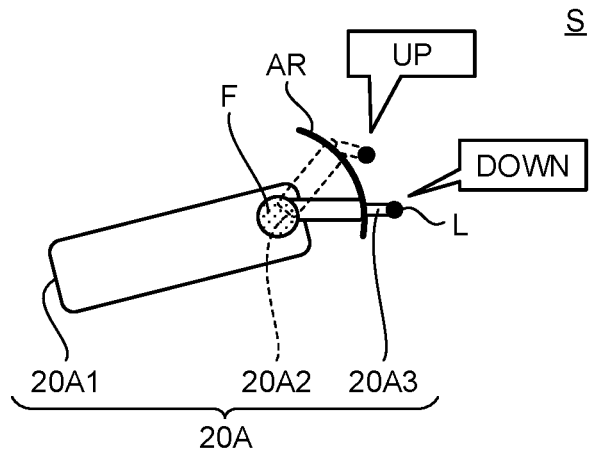
FIG. 9C is an explanatory diagram in which an operation is performed on the virtual operation surface using the wrist part as the fulcrum.

FIG. 9C is an explanatory diagram illustrating an example of operation execution processing by the operation control unit 30F based on the state in which the user 20 causes the finger part 20A3 to pass through the virtual operation surface AR or the motion of swinging up the finger part 20A3 using the wrist part 20A2 as the fulcrum F.

A scene is assumed in which the user 20 swings down the finger part 20A3 side using the wrist part 20A2 as the fulcrum F by moving the finger part 20A3 side at a constant speed or more, and then the finger part 20A3 stops in a state in which it has passed through the virtual operation surface AR. When determining that the finger part 20A3 of the user 20 has passed through the virtual operation surface AR identified by the virtual operation surface information stored in the virtual operation surface management information 32B by analyzing the detection result by the detection unit 30B, the operation control unit 30F determines the start of the operation to the device 14.

In addition, the operation control unit 30F identifies the virtual operation surface AR through which the finger part 20A3 has passed as the virtual operation surface AR used for the operation of the device 14. Furthermore, similarly to the above, the operation control unit 30F identifies the part of the body that is used as the fulcrum F by the user 20. Here, a scene is assumed in which the detection unit 30B identifies the wrist part 20A2 as the fulcrum F.

Then, the operation control unit 30F determines that the touch-down operation has been performed when the finger part 20A3 of the user 20 stops in the state in which it has passed through the virtual operation surface AR. In addition, the operation control unit 30F identifies the 3D position coordinates in the real space S, which are detected by the detection unit 30B, of the finger part 20A3 that has stopped in the state of passing through the virtual operation surface AR, and as an operation position L with respect to the operation accepting surface 14A of the device 14. Specifically, the operation control unit 30F identifies the 2D position coordinates obtained by transforming the 3D position coordinates of the finger part 20A3 in the real space S with the 2D coordinate transformation unit 30E as the operation position L on the operation accepting surface 14A.

Then, the operation control unit 30F executes, on the device 14, the operation corresponding to the touch-down operation to the identified operation position L on the operation accepting surface 14A.

In addition, for example, a scene is assumed in which the user 20 moves the wrist part 20A2 and the finger part 20A3 using the wrist part 20A2 as the fulcrum F, and then swings up the finger part 20A3B. In this case, the operation control unit 30F determines that the touch-up operation has been performed. Then, the operation control unit 30F executes, on the device 14, the operation corresponding to the touch-up operation to the identified operation position L on the operation accepting surface 14A.

Figure 9D:
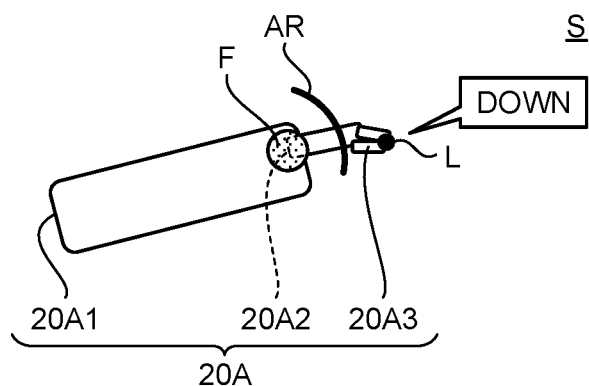
FIG. 9D is an explanatory diagram in which an operation is performed on the virtual operation surface using the wrist part as the fulcrum.

FIG. 9D is an explanatory diagram of an example of operation execution processing by the operation control unit 30F in a case where the finger part 20A3 of the user 20 performs the pinching motion in the state in which it has passed through the virtual operation surface AR.

As illustrated in FIG. 9D, for example, a scene is assumed in which the user 20 moves the finger part 20A3 at a constant speed or more using the wrist part 20A2 as the fulcrum F, and then the pinching motion for pinching a virtual object is performed in the state in which the finger part 20A3 has passed through the virtual operation surface AR.

When determining that the finger part 20A3 of the user 20 has passed through the virtual operation surface AR identified by the virtual operation surface information stored in the virtual operation surface management information 32B by analyzing the detection result by the detection unit 30B, the operation control unit 30F determines the start of the operation to the device 14.

In addition, similarly to the above, the operation control unit 30F identifies the virtual operation surface AR through which the finger part 20A3 has passed as the virtual operation surface AR used for the operation of the device 14. Furthermore, similarly to the above, the operation control unit 30F identifies the part of the body that is used as the fulcrum F by the user 20. Then, the operation control unit 30F executes, on the device 14, the operation corresponding to the identified virtual operation surface AR used for the operation of the device 14 and the motion status of the finger part 20A3 of the user 20 positioned on the virtual operation surface AR and on the device 14 side from the virtual operation surface AR.

Specifically, the operation control unit 30F determines that the touch-down operation has been performed when the finger part 20A3 of the user 20 performs the pinching motion in the state in which it has passed through the virtual operation surface AR. The operation control unit 30F may determine whether or not the pinching motion has been performed using the detection result by the detection unit 30B. In addition, the operation control unit 30F identifies the 3D position coordinates in the real space S, which are detected by the detection unit 30B, of the point at which the pinching motion is performed by the finger part 20A3 in the state of passing through the virtual operation surface AR, as the operation position L with respect to the operation accepting surface 14A of the device 14. Specifically, the operation control unit 30F identifies the 2D position coordinates obtained by transforming the 3D position coordinates of the finger part 20A3 in the real space S with the 2D coordinate transformation unit 30E as the operation position L on the operation accepting surface 14A.

Then, the operation control unit 30F executes, on the device 14, the operation corresponding to the touch-down operation to the identified operation position L on the operation accepting surface 14A.

In addition, for example, a scene is assumed in which the finger part 20A3 of the user 20 is opened in the state in which it has passed through the virtual operation surface AR and the pinching motion is canceled. In this case, the operation control unit 30F determines that the touch-up operation has been performed. Then, the operation control unit 30F executes, on the device 14, the operation corresponding to the touch-up operation to the identified operation position L on the operation accepting surface 14A.

Figure 9E:
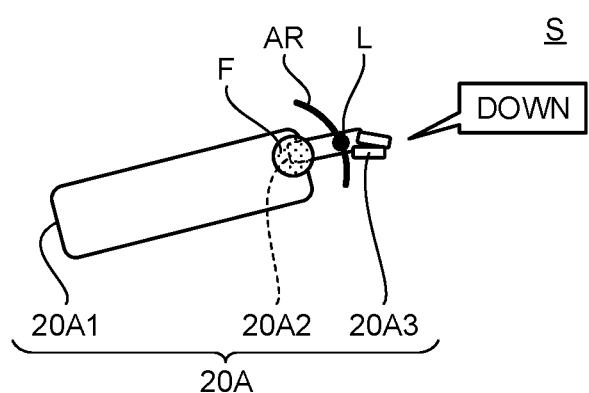
FIG. 9E is an explanatory diagram in which an operation is performed on the virtual operation surface using the wrist part as the fulcrum.

FIG. 9E is an explanatory diagram illustrating an example of operation execution processing by the operation control unit 30F in a case where the operation control unit 30F resets the position of the virtual operation surface AR identified as the virtual operation surface AR used for the operation of the device 14 to be closer to the elbow part 20A1 of the user 20, and the finger part 20A3 of the user 20 performs the pinching motion in the state in which it has passed through the virtual operation surface AR.

As illustrated in FIG. 9E, for example, the operation control unit 30F resets the virtual operation surface AR to be closer to the elbow part 20A1 of the user 20 than the setting position where the virtual operation surface AR has been accepted. FIG. 9E illustrates, as an example, a state in which the virtual operation surface AR arranged at the position corresponding to the distal end part of the finger part 20A3 is reset to be closer to the position on the wrist part 20A2.

Then, for example, a scene is assumed in which the user 20 moves the finger part 20A3 at a constant speed or more using the wrist part 20A2 as the fulcrum F, and then the pinching motion for pinching a virtual object is performed in the state in which the finger part 20A3 has passed through the reset virtual operation surface AR.

When determining that the finger part 20A3 of the user 20 has passed through the virtual operation surface AR identified by the virtual operation surface information stored in the virtual operation surface management information 32B by analyzing the detection result by the detection unit 30B, the operation control unit 30F determines the start of the operation to the device 14.

In addition, similarly to the above, the operation control unit 30F identifies the virtual operation surface AR through which the finger part 20A3 has passed as the virtual operation surface AR used for the operation of the device 14. Furthermore, similarly to the above, the operation control unit 30F identifies the part of the body that is used as the fulcrum F by the user 20. Then, the operation control unit 30F executes, on the device 14, the operation corresponding to the motion status of the finger part 20A3 of the user 20 positioned on the identified virtual operation surface AR and on the device 14 side from the virtual operation surface AR.

Specifically, the operation control unit 30F determines that the touch-down operation has been performed when the finger part 20A3 of the user 20 performs the pinching motion in the state in which it has passed through the virtual operation surface AR. The operation control unit 30F may determine whether or not the pinching motion has been performed using the detection result by the detection unit 30B. In addition, the operation control unit 30F identifies the 3D position coordinates in the real space S, which are detected by the detection unit 30B, of the point at which the pinching motion is performed by the finger part 20A3 in the state of passing through the virtual operation surface AR, as the operation position L with respect to the operation accepting surface 14A of the device 14. Specifically, the operation control unit 30F identifies the 2D position coordinates obtained by transforming the 3D position coordinates of the finger part 20A3 in the real space S with the 2D coordinate transformation unit 30E as the operation position L on the operation accepting surface 14A.

Then, the operation control unit 30F executes, on the device 14, the operation corresponding to the touch-down operation to the identified operation position L on the operation accepting surface 14A.

In addition, for example, a scene is assumed in which the finger part 20A3 of the user 20 is opened in the state in which it has passed through the virtual operation surface AR and the pinching motion is canceled. In this case, the operation control unit 30F determines that the touch-up operation has been performed. Then, the operation control unit 30F executes, on the device 14, the operation corresponding to the touch-up operation to the identified operation position L on the operation accepting surface 14A.

Note that the determination based on the pinching motion described with reference to FIGS. 7B, 7C, 9D, 9E, and the like is merely an example, and the motion of the user 20 representing the processing content on the device 14 is not limited to the pinching motion. For example, the operation control unit 30F may determine that a motion representing a processing content such as touch-up and touch-down has been performed based on a motion such as upward or downward movement of the finger part 20A3 of the user 20 or another hand gesture by the user 20. In this case, for example, the storage unit 32 may store in advance the motion information representing the motion of the user 20 and the processing content represented by the motion information in association with each other. As described above, the processing content is, for example, touch-down, touch-up, flick, drag, or the like, but is not limited thereto. Then, the operation control unit 30F may determine that the operation represented by the processing content has been performed by identifying, from the storage unit 32, the processing content corresponding to the motion information of the motion represented by the detection result by the detection unit 30B. Then, the operation control unit 30F may execute the determined operation to the device 14.

As described with reference to FIGS. 7A to 9E, when determining that a predetermined part of the body of the user 20 comes into contact with the virtual operation surface AR or passes through the virtual operation surface AR, the operation control unit 30F determines the start of the operation to the device 14, and executes the operation corresponding to the motion status of the part of the body after the determination of the start of the operation to the device 14.

Here, there is a case where the arm part 20A of the user 20 being operated is moved with respect to the virtual operation surface AR, causing the fulcrum F position to be moved. Thus, when the movement of the specific part of the user 20 used as the fulcrum F corresponding to the virtual operation surface AR is detected, the operation control unit 30F preferably resets the virtual operation surface AR to a position and a posture corresponding to the movement of the fulcrum F.

Figure 10A:
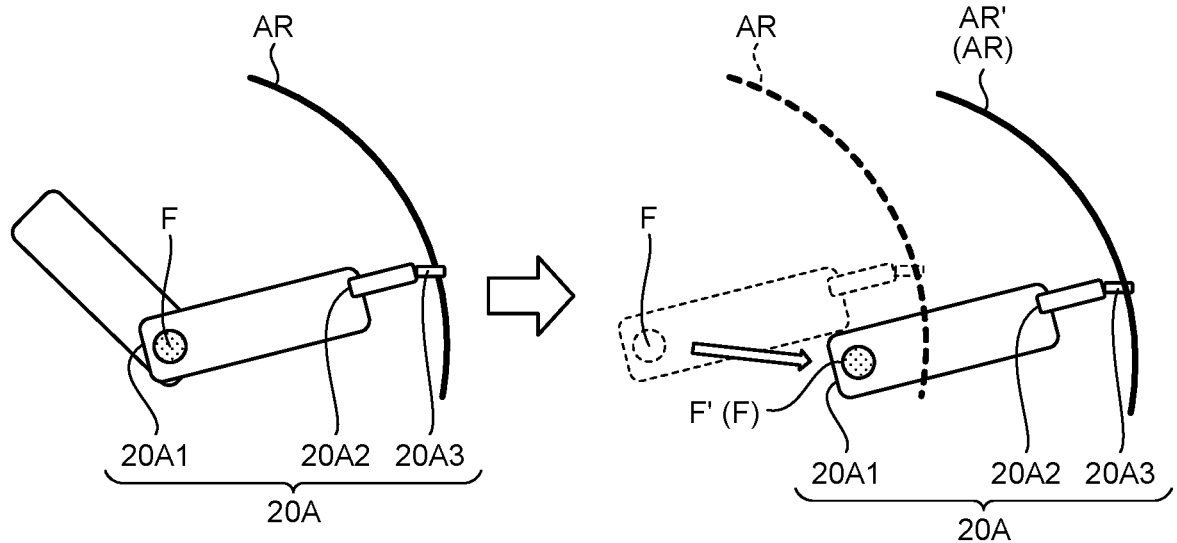
FIG. 10A is an explanatory diagram of a scene in which the position of the elbow part serving as the fulcrum is moved.

FIG. 10A is an explanatory diagram illustrating an example of a scene in which the position of the elbow part 20A1 of the user 20 used as the fulcrum F is moved to the position of the fulcrum F' when the user 20 performs an operation to the virtual operation surface AR set with the elbow part 20A1 as the fulcrum F.

In this case, the operation control unit 30F resets the virtual operation surface AR by moving and changing the position and posture of the virtual operation surface AR identified as the virtual operation surface AR on the device 14 in the real space S, following the positional movement of the fulcrum F identified by the fulcrum position information of each fulcrum F from the fulcrum F before the movement to the fulcrum F' after the movement, according to the movement of the fulcrum F that is the specific part of the user 20. FIG. 10A is an explanatory diagram illustrating an example of a scene in which the virtual operation surface AR' after the virtual operation surface AR is horizontally moved according to the horizontal movement of the fulcrum F from the fulcrum F to the fulcrum F' is used as the virtual operation surface AR.

Figure 10B:
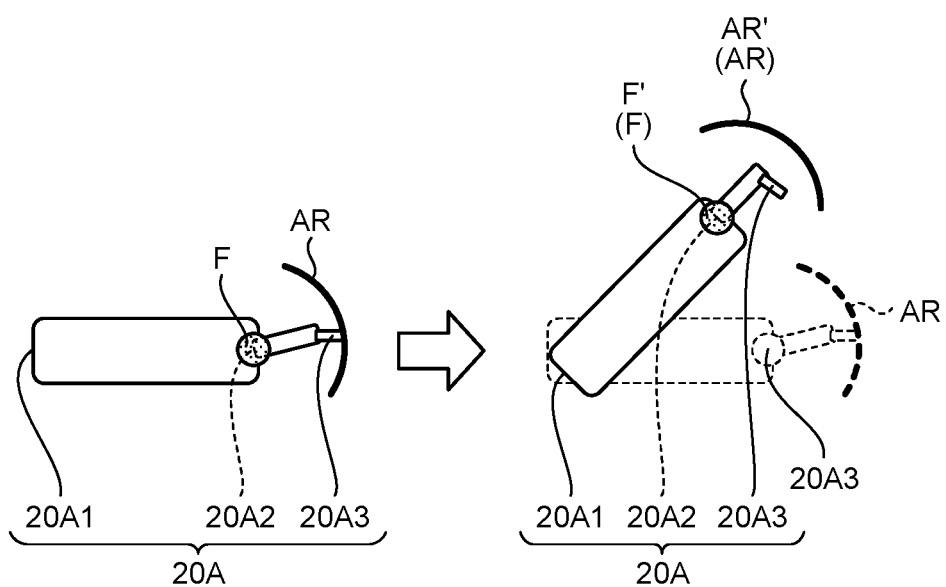
FIG. 10B is an explanatory diagram of a scene in which the position of the wrist part serving as the fulcrum is moved.

FIG. 10B is an explanatory diagram illustrating an example of a scene in which the position of the wrist part 20A2 of the user 20 used as the fulcrum F is moved when the user 20 performs an operation to the virtual operation surface AR set with the wrist part 20A2 as the fulcrum F.

In this case, the operation control unit 30F resets the virtual operation surface AR by moving and changing the position and posture of the virtual operation surface AR identified as the virtual operation surface AR on the device 14 in the real space S, following the positional movement of the fulcrum F identified by the fulcrum position information of the fulcrum F, according to the movement of the fulcrum F that is the specific part of the user 20. FIG. 10B is an explanatory diagram illustrating an example of a scene in which the virtual operation surface AR' after the virtual operation surface AR is moved according to the movement of the fulcrum F from the fulcrum F to the fulcrum F' in the direction intersecting the horizontal direction is used as the virtual operation surface AR.

The operation control unit 30F may change and reset the position and posture (angle) of the virtual operation surface AR in the real space S following the movement and the change in posture of the fulcrum F.

Note that a plurality of virtual operation surfaces AR may be set as described with reference to FIGS. 6A to 6C. Even in this case, the operation control unit 30F may execute the above-described operation execution processing using the virtual operation surface AR represented by the virtual operation surface information for which the touching or passing of the arm part 20A of the user 20 is determined, among the plurality of pieces of virtual operation surface information registered in the virtual operation surface management information 32B. That is, the operation control unit 30F may operate the device 14 based on the positional relationship between the part of the body of the user 20 and each of the plurality of virtual operation surfaces AR.

Therefore, for example, in a case where the user 20 touches or passes through the plurality of virtual operation surfaces AR using both the right arm and the left arm, the operation control unit 30F identifies the plurality of virtual operation surfaces AR for which the touching or passing is determined as the virtual operation surfaces AR for accepting the operation to the device 14, and may execute the operation processing as described above.

Next, an example of a flow of information processing executed by the information processing apparatus 10 according to the present embodiment will be described.

FIG. 11 is a flowchart illustrating an example of a flow of virtual operation surface information registration processing.

For example, when accepting a virtual operation surface setting start instruction, the information processing apparatus 10 executes the virtual operation surface information registration processing illustrated in FIG. 11. For example, when determining that the virtual operation surface setting start instruction is accepted according to the analysis of an imaged image of a gesture of the user 20 or an operation instruction of the input unit 18 by the user 20, the information processing apparatus 10 executes the virtual operation surface information registration processing illustrated in FIG. 11. Note that the imaging unit 12 sequentially images the user 20 in chronological order, and sequentially outputs the imaged images obtained by the imaging to the image receiving unit 30A.

The detection unit 30B of the information processing apparatus 10 starts the detection of the landmark, which is a specific part of the user 20, included in the imaged image received by the image receiving unit 30A (step S100). The detection unit 30B starts identifying the specific parts that are landmarks such as the arm part 20A, the elbow part 20A1, the wrist part 20A2, and the finger part 20A3 of the user 20, and identifying the 3D position coordinates of each of the identified specific parts in the real space S.

The accepting unit 30C accepts the setting of the virtual operation surface AR (step S102). For example, the user 20 sets the virtual operation surface AR having a shape corresponding to the operation accepting surface 14A of the device 14, using the elbow part 20A1 of the user 20 as the fulcrum F. Specifically, as described above, the user 20, while being seated on the chair 16, moves the wrist part 20A2, the finger part 20A3, or the like using the elbow part 20A1, the wrist part 20A2, or the like as the fulcrum F, designates four vertexes P in the real space S. By accepting the designation of these four vertexes P, the accepting unit 30C accepts the setting of the virtual operation surface AR.

The accepting unit 30C determines whether or not a determination instruction has been accepted (step S104). When determining the operation instruction of the input unit 18 by the user 20 or a predetermined gesture by the user 20, the accepting unit 30C determines that the determination instruction has been accepted. When a negative determination is made in step S104 (step S104: No), the process returns to step S102. When a positive determination is made in step S104 (step S104: Yes), the process proceeds to step S106.

In step S106, it is determined whether or not the four vertexes P have been set (step S106). When a negative determination is made in step S106 (step S106: No), the process returns to step S102. When a positive determination is made in step S106 (step S106: Yes), the process proceeds to step S108.

In step S108, the accepting unit 30C accepts the fulcrum position information on the fulcrum F used when the setting of the virtual operation surface AR is accepted (step S108). The accepting unit 30C may determine which part of the user 20 is used as the fulcrum F when the setting of the virtual operation surface AR is accepted by analyzing the status of the body of the user 20. In addition, the accepting unit 30C may accept the fulcrum position information input by the operation instruction of the input unit 18 by the user.

Then, the setting unit 30D registers, in the virtual operation surface management information 32B, the virtual operation surface information of the virtual operation surface AR that has been accepted by the accepting unit 30C and the fulcrum position information representing the part of the body used as the fulcrum F when the setting of the virtual operation surfaces AR is accepted and the 3D position coordinates of the part in the real space S in association with each other (step S110). Then, this routine is ended.

Figure 12:
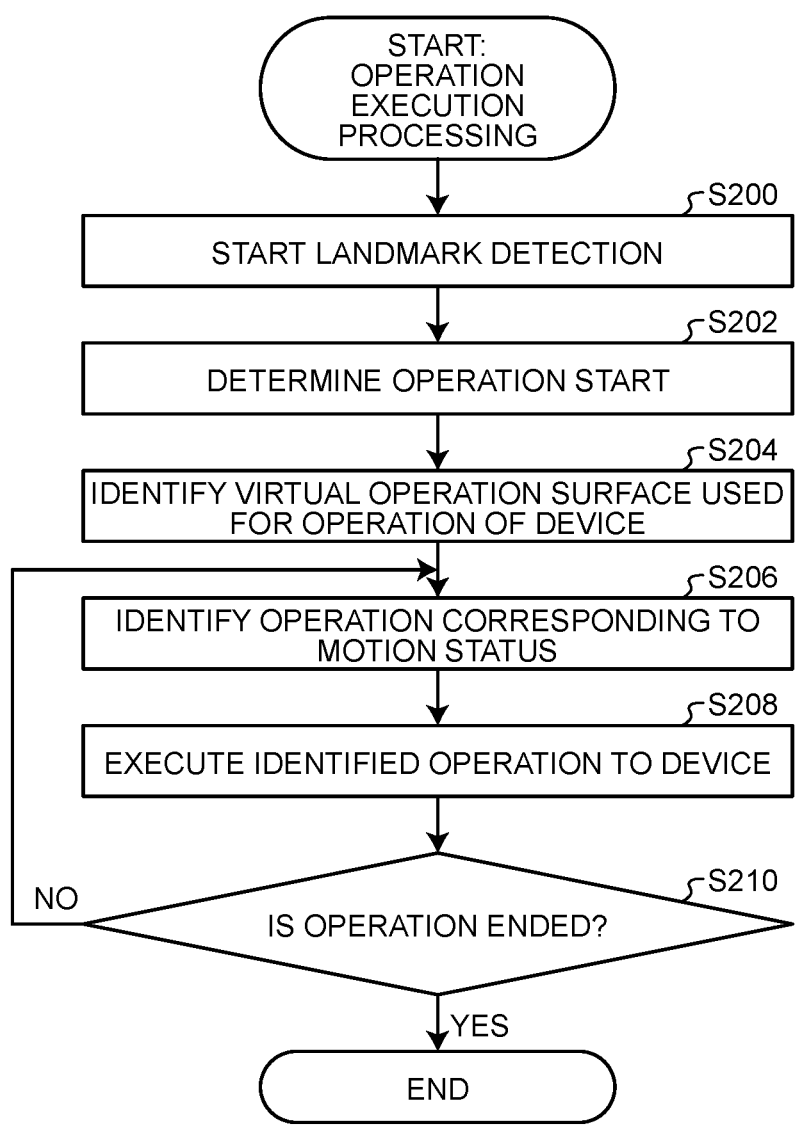
FIG. 12 is a flowchart illustrating an example of a flow of operation execution processing.

FIG. 12 is a flowchart illustrating an example of a flow of operation execution processing.

For example, when accepting an operation execution start instruction, the information processing apparatus 10 executes the operation execution processing illustrated in FIG. 12. For example, when determining that the operation execution start instruction is accepted according to the analysis of an imaged image of a gesture of the user 20 or an operation instruction of the input unit 18 by the user 20, the information processing apparatus 10 executes the operation execution processing illustrated in FIG. 12. Note that the imaging unit 12 sequentially images the user 20 in chronological order, and sequentially outputs the imaged images obtained by the imaging to the image receiving unit 30A.

The detection unit 30B of the information processing apparatus 10 starts the detection of the landmark, which is a specific part of the user 20, included in the imaged image received by the image receiving unit 30A (step S200). The detection unit 30B starts identifying the specific parts that are landmarks such as the arm part 20A, the elbow part 20A1, the wrist part 20A2, and the finger part 20A3 of the user 20, and identifying the 3D position coordinates of each of the identified specific parts in the real space S.

When determining that a predetermined part of the body of the user 20 such as the wrist part 20A2 and the finger part 20A3 comes into contact with the virtual operation surface AR or passes through the virtual operation surface AR, the operation control unit 30F determines the start of the operation to the device 14 (step S202).

In addition, the operation control unit 30F identifies the virtual operation surface AR used for determining the start of the operation in step S202 as the virtual operation surface AR used for the operation of the device 14 (step S204).

Then, the operation control unit 30F identifies the operation corresponding to the motion status of the arm part 20A of the user 20 positioned on the virtual operation surface AR identified in step S204 and on the device 14 side from the virtual operation surface AR (step S206). As described above, the motion status of the arm part 20A includes contacting the virtual operation surface AR, canceling the contact, the pinching motion of the finger part 20A3, canceling the pinching motion, the retracting motion of the finger part 20A3, canceling the retracting motion, and the like. For example, the operation control unit 30F may store operation information representing an operation corresponding to each of a plurality of types of motion statuses in advance, and read the operation information corresponding to the determined motion status, thereby identifying the operation represented by the operation information.

Then, the operation control unit 30F may execute the operation determined in step S206 on the device 14 (step S208).

Next, the information processing apparatus 10 determines whether or not to end the operation (step S210). For example, the information processing apparatus 10 determines whether or not an operation end instruction has been given by the operation instruction of the input unit 18 by the user 20 or the gesture of the user 20. When a negative determination is made in step S210 (step S210: No), the process returns to step S206. When a positive determination is made in step S210 (step S210: Yes), this routine is ended.

As described above, the information processing apparatus 10 according to the present embodiment includes the accepting unit 30C and the operation control unit 30F. The accepting unit 30C accepts the setting of the virtual operation surface AR to be used for determining the operation to the device 14. The operation control unit 30F operates the device 14 based on the positional relationship between the part of the body of the user 20 and the virtual operation surface AR.

Here, the operation to the device 14 is desirably easy to operate for the user 20. For example, the intersection between a straight line passing through the eyes and the fingertip of the user 20 and the operation accepting surface 14A of the device 14 is considered as the operation position on the operation accepting surface 14A. However, the movable range of the fingertip is limited in a case where the user 20 performs an operation in a comfortable posture with a part of the body fixed, such as when the arm drops or the elbow part 20A1 is placed on the elbow placing part 16A. For this reason, in the prior art, there is a case where the possible range of the intersection between the straight line passing through the eyes and the fingertip of the user 20 and the operation accepting surface 14A of the device 14 is limited, making it difficult to easily operate the device 14.

On the other hand, in the information processing apparatus 10 according to the present embodiment, the accepting unit 30C accepts the setting by the user 20 of the virtual operation surface AR to be used for determining the operation to the device 14. This allows the user 20 to set an arbitrary virtual operation surface AR in the real space S in a state of the body in which the user 20 easily performs an operation. For example, the user 20 seated on the chair 16 or the like can set the desired virtual operation surface AR in the real space S so that the user 20 can perform an operation in an arbitrary comfortable posture in which the user is less likely to get tired, with the arm part 20A or the like placed on the elbow placing part 16A. Then the operation control unit 30F operates the device 14 based on the positional relationship between the part of the body of the user 20 and the virtual operation surface AR.

For this reason, the information processing apparatus 10 according to the present embodiment can set a limited operation area that is set in an arbitrary area in the real space S and is easy to operate for the user 20 as the virtual operation surface AR to be used for determining the operation to the device 14. Thus, the user 20 can easily operate the device 14 by operating the virtual operation surface AR that is a limited operation area in the real space S.

Therefore, the information processing apparatus 10 according to the present embodiment can facilitate the operation to the virtual operation surface AR.

In addition, the accepting unit 30C of the information processing apparatus 10 according to the present embodiment can accept, as the setting of the virtual operation surface AR, the area of the range set by moving a part on the finger part 20A3 side from a predetermined part in the arm part 20A, using the predetermined part in the arm part 20A of the user 20 as the fulcrum F. Furthermore, the accepting unit 30C can accept the setting of the virtual operation surface AR on the surface of the object, such as the elbow placing part 16A, in the real space S.

For this reason, the information processing apparatus 10 according to the present embodiment can set a limited operation area that is set by the user 20 in an arbitrary area in the real space S and is easy to operate for the user 20 as the virtual operation surface AR to be used for determining the operation to the device 14.

Therefore, in addition to the above effects, the information processing apparatus 10 according to the present embodiment can achieve the operation to the virtual operation surface AR in the comfortable posture of the user 20 and the reduction in fatigue of the user 20.

The present technique can also have the following configurations.

(1)

An information processing apparatus including:
an accepting unit configured to accept a setting of a virtual operation surface to be used for determining an operation to a device, and
an operation control unit configured to operate the device based on a positional relationship between a part of a body of a user and the virtual operation surface.

(2)

The information processing apparatus according to (1), wherein
the accepting unit is configured to
accept the setting of the virtual operation surface having a shape corresponding to an operation accepting surface of the device.

(3)

The information processing apparatus according to (1) or (2), wherein
the accepting unit is configured to
accept, as the setting of the virtual operation surface, an area of a range set by moving a part of an arm part using a predetermined part in the arm part of the user as a fulcrum, the part being closer to a finger part than the predetermined part.

(4)

The information processing apparatus according to any one of (1) to (3), wherein
the accepting unit is configured to
accept the setting of the virtual operation surface on a surface of an object in a real space.

(5)

The information processing apparatus according to any one of (1) to (4), wherein
the accepting unit is configured to
accept the setting of the virtual operation surface in a planar or curved shape.

(6)

The information processing apparatus according to any one of (1) to (5), further including
a setting unit configured to set fulcrum position information and virtual operation surface information in association with each other, the fulcrum position information being on a fulcrum used when accepting the setting of the virtual operation surface, the virtual operation surface information representing the virtual operation surface.

(7)

The information processing apparatus according to (6), wherein
the fulcrum is
at least one of an elbow part and a wrist part in an arm part of the user.

(8)

The information processing apparatus according to any one of (1) to (7), further including
an image receiving unit is configured to receive an imaged image of the user; and
a detection unit is configured to detect a status of the body of the user based on the imaged image, wherein
the operation control unit is configured to
determine a start of an operation to the device when determining that a predetermined part of the body of the user comes into contact with the virtual operation surface or passes through the virtual operation surface, and execute, to the device, the operation corresponding to a motion status of the part of the body after determining the start of the operation.

(9)

The information processing apparatus according to any one of (1) to (8), wherein
the operation control unit is configured to
reset the virtual operation surface to be closer to an elbow part of the user than a setting position in the accepting, and operate the device based on a positional relationship between the virtual operation surface thus reset and the part of the body of the user.

(10)

The information processing apparatus according to any one of (1) to (9), wherein
the operation control unit is configured to,
when detecting a movement of a specific part of the user, the specific part being used as a fulcrum corresponding to the virtual operation surface, reset the virtual operation surface in a position and a posture corresponding to the movement of the fulcrum.

(11)

The information processing apparatus according to any one of (1) to (10), wherein
the accepting unit is configured to
accept, as the setting of the virtual operation surface, settings of a plurality of virtual operation surfaces different from each other in at least one of a position and a range in a real space.

(12)

The information processing apparatus according to (11), wherein
the operation control unit is configured to
operate the device based on the positional relationship between the part of the body of the user and each of the plurality of virtual operation surfaces.

(13)

An information processing system including:
an imaging device; a device; and an information processing apparatus, wherein
the information processing apparatus includes:
an image receiving unit configured to receive an imaged image of a user from the imaging device,
a detection unit configured to detect a status of a body of the user based on the imaged image,
an accepting unit configured to accept a setting of a virtual operation surface to be used for determining an operation to the device, and
an operation control unit configured to operate the device based on a positional relationship between a part of a body of the user and the virtual operation surface.

(14)

An information processing method executed by a processor, including:
accepting a setting of a virtual operation surface to be used for determining an operation to a device; and
operating the device based on a positional relationship between a part of a body of a user and the virtual operation surface.

Such an information processing apparatus, information processing system, and information processing method according to the present disclosure make it possible to facilitate the operation to the virtual operation surface.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a memory in which a program is stored; and
a processor coupled to the memory and configured to perform processing by executing the program, the processing including:
accepting a setting of a virtual operation surface to be used for determining an operation to a device; and
operating the device based on a positional relationship between a part of a body of a user and the virtual operation surface;
wherein the accepting the setting of the virtual operation surface includes generating the virtual operation surface by moving a first part of an arm of the user in association with a second part of the arm that operates as a fulcrum to set a range area as determined by the moving the first part of the arm,
wherein the first part of the arm comprises a finger of the user, and
wherein the range area is represented by 3-D position coordinates of vertexes designated by the moving the first part of the arm and a line connecting the vertexes.

2. The information processing apparatus according to claim 1, wherein in the accepting, the setting of the virtual operation surface having a shape corresponding to an operation accepting surface of the device is accepted.

3. The information processing apparatus according to claim 1, wherein in the accepting, the setting of the virtual operation surface on a surface of an object in a real space is accepted.

4. The information processing apparatus according to claim 1, wherein in the accepting, the setting of the virtual operation surface in a planar or curved shape is accepted.

5. The information processing apparatus according to claim 1, wherein the processing further includes:
setting fulcrum position information and virtual operation surface information in association with each other, the fulcrum position information being on the fulcrum used when accepting the setting of the virtual operation surface, the virtual operation surface information representing the virtual operation surface.

6. The information processing apparatus according to claim 5, wherein the second part of the arm that operates as the fulcrum comprises at least one of an elbow and a wrist of the user.

7. The information processing apparatus according to claim 1, wherein the processing includes:

receiving an imaged image of the user; and detecting a status of the body of the user based on the imaged image, wherein in the operating, a start of an operation to the device is determined when determining that a predetermined part of the body of the user comes into contact with the virtual operation surface or passes through the virtual operation surface, and the operation corresponding to a motion status of the predetermined part of the body after determining the start of the operation is executed to the device.

8. The information processing apparatus according to claim 1, wherein in the operating, the virtual operation surface is reset to be closer to an elbow part of the user than a setting position in the accepting, and the device is operated based on a positional relationship between the virtual operation surface reset and the elbow part of the body of the user.

9. The information processing apparatus according to claim 1, wherein in the operating, when detecting a movement of the second part of the arm that operates as the fulcrum corresponding to the virtual operation surface, the virtual operation surface is reset in a position and a posture corresponding to the movement of the fulcrum.

10. The information processing apparatus according to claim 1, wherein in the accepting, settings of a plurality of virtual operation surfaces different from each other in at least one of a position and a range in a real space are accepted as the setting of the virtual operation surface.

11. The information processing apparatus according to claim 10, wherein in the operating, the device is operated based on the positional relationship between the part of the body of the user and each of the plurality of virtual operation surfaces.

12. An information processing system comprising:
an imaging device;
a device; and
an information processing apparatus, wherein the information processing apparatus comprises:
a memory in which a program is stored; and
a processor coupled to the memory and configured to perform processing by executing the program, the processing including:

receiving an imaged image of a user from the imaging device;

detecting a status of a body of the user based on the imaged image;

accepting a setting of a virtual operation surface to be used for determining an operation to the device; and operating the device based on a positional relationship between a part of a body of the user and the virtual operation surface;

wherein the accepting the setting of the virtual operation surface includes generating the virtual operation surface by moving a first part of an arm of the user in association with a second part of the arm that operates as a fulcrum to set a range area as determined by the moving the first part of the arm, wherein the first part of the arm comprises a finger of the user, and wherein the range area is represented by 3-D position coordinates of vertexes designated by the moving the first part of the arm and a line connecting the vertexes.

13. An information processing method executed by a processor, the information processing method comprising:

accepting a setting of a virtual operation surface to be used for determining an operation to a device; and operating the device based on a positional relationship between a part of a body of a user and the virtual operation surface, wherein the accepting the setting of the virtual operation surface includes generating the virtual operation surface by moving a first part of an arm of the user in association with a second part of the arm that operates as a fulcrum to set a range area as determined by the moving the first part of the arm, wherein the first part of the arm comprises a finger of the user, and wherein the range area is represented by 3-D position coordinates of vertexes designated by the moving the first part of the arm and a line connecting the vertexes.

* * * * *